US008406794B2

(12) United States Patent
Lee et al.

(10) Patent No.: US 8,406,794 B2
(45) Date of Patent: Mar. 26, 2013

(54) METHODS AND APPARATUSES OF INITIATING COMMUNICATION IN WIRELESS NETWORKS

(75) Inventors: Chong U. Lee, San Diego, CA (US); Amal Ekbal, San Diego, CA (US); David Jonathan Julian, San Diego, CA (US); Kamran Moallemi, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1115 days.

(21) Appl. No.: 11/740,118

(22) Filed: Apr. 25, 2007

(65) Prior Publication Data

US 2007/0281721 A1 Dec. 6, 2007

Related U.S. Application Data

(60) Provisional application No. 60/795,512, filed on Apr. 26, 2006.

(51) Int. Cl.
*H04Q 7/20* (2006.01)

(52) U.S. Cl. ........ 455/502; 455/501; 455/500; 455/517; 455/426.1; 455/522; 370/310; 370/350; 370/503; 370/508; 370/345

(58) Field of Classification Search .................. 455/502, 455/501, 500, 517, 522, 69, 426.1, 426.2, 455/403, 422.1, 550.1, 569.1, 575.1, 90.1–90.3; 370/310, 345, 350, 503, 498, 505, 508–514
See application file for complete search history.

(56) References Cited

U.S. PATENT DOCUMENTS

| | | | |
|---|---|---|---|
| 4,796,004 A | 1/1989 | Rich et al. |
| 5,196,825 A | 3/1993 | Young |
| 5,225,842 A | 7/1993 | Brown et al. |
| 5,298,904 A | 3/1994 | Olich |
| 5,341,481 A | 8/1994 | Tsukamoto |
| 5,406,284 A | 4/1995 | Lin et al. |
| 5,479,522 A | 12/1995 | Lindemann et al. |
| 5,617,058 A | 4/1997 | Adrian et al. |
| 5,687,169 A | 11/1997 | Fullerton |
| 5,742,772 A | 4/1998 | Sreenan |
| 5,764,696 A | 6/1998 | Barnes et al. |

(Continued)

FOREIGN PATENT DOCUMENTS

| CN | 1647458 A | 7/2005 |
|---|---|---|
| CN | 1722785 A | 1/2006 |

(Continued)

OTHER PUBLICATIONS

International Search Report, PCT/US07/067573, International Search Authority, European Patent Office, Feb. 12, 2008.

(Continued)

*Primary Examiner* — Keith Ferguson
(74) *Attorney, Agent, or Firm* — Dang M. Vo; Paul S. Holdaway

(57) ABSTRACT

Aspects include methods and apparatuses for communicating in an ultra-wideband network. For example, some aspects include a method of wireless communications. The method may include receiving information identifying at least one resource of a second electronic device, transmitting resource information of the electronic device, comparing the resource information of the electronic device and the received resource information of the second electronic device. The method may also include transmitting a synchronization signal to the second device based on the comparing. The method may also include receiving a synchronization signal from the second device based on the comparing. Other aspects include apparatus and devices for wireless communications.

130 Claims, 13 Drawing Sheets

U.S. PATENT DOCUMENTS

| | | |
|---|---|---|
| 5,812,081 A | 9/1998 | Fullerton |
| 5,832,035 A | 11/1998 | Fullerton |
| 5,907,427 A | 5/1999 | Scalora et al. |
| 5,933,582 A | 8/1999 | Yamada |
| 5,952,956 A | 9/1999 | Fullerton |
| 5,956,681 A | 9/1999 | Yamakita |
| 5,956,683 A | 9/1999 | Jacobs et al. |
| 5,960,031 A | 9/1999 | Fullerton et al. |
| 5,963,581 A | 10/1999 | Fullerton et al. |
| 5,969,663 A | 10/1999 | Fullerton et al. |
| 5,995,534 A | 11/1999 | Fullerton et al. |
| 6,028,853 A * | 2/2000 | Haartsen ................. 370/338 |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,141,705 A | 10/2000 | Anand et al. |
| 6,177,903 B1 | 1/2001 | Fullerton et al. |
| 6,178,323 B1 | 1/2001 | Nagata |
| 6,218,979 B1 | 4/2001 | Barnes et al. |
| 6,295,019 B1 | 9/2001 | Richards et al. |
| 6,297,737 B1 | 10/2001 | Irvin |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Fullerton et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,515,588 B1 | 2/2003 | Sarabia |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,594,628 B1 | 7/2003 | Jacobs et al. |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,693,571 B2 | 2/2004 | Melanson et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,678 B2 | 7/2004 | Arens |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,831,508 B2 | 12/2004 | Shima |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,868,073 B1 | 3/2005 | Carrender |
| 6,879,878 B2 | 4/2005 | Glenn et al. |
| 6,882,301 B2 | 4/2005 | Fullerton |
| 6,895,034 B2 | 5/2005 | Nunally et al. |
| 6,898,414 B2 | 5/2005 | Ekl et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,924,700 B2 | 8/2005 | Taura et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,020,701 B1 | 3/2006 | Gelvin et al. |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,034,609 B2 | 4/2006 | Risbo et al. |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,057,456 B2 | 6/2006 | Taura et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,206,423 B1 | 4/2007 | Feng et al. |
| 7,209,724 B2 | 4/2007 | Richards et al. |
| 7,230,980 B2 | 6/2007 | Langford et al. |

| | | | |
|---|---|---|---|
| 7,239,277 B2 | 7/2007 | Fullerton et al. | |
| RE39,759 E | 8/2007 | Fullerton | |
| 7,256,727 B2 | 8/2007 | Fullerton et al. | |
| 7,271,779 B2 | 9/2007 | Hertel | |
| 7,279,965 B2 | 10/2007 | Hansen et al. | |
| 7,286,009 B2 | 10/2007 | Andersen et al. | |
| 7,324,479 B2 * | 1/2008 | Hur | 370/332 |
| 7,348,840 B2 | 3/2008 | Magrath et al. | |
| 7,388,886 B2 | 6/2008 | Perkins et al. | |
| 7,576,605 B2 | 8/2009 | Lee et al. | |
| 2001/0049471 A1 | 12/2001 | Suzuki et al. | |
| 2002/0100061 A1 | 7/2002 | Tsusaka et al. | |
| 2002/0109501 A1 | 8/2002 | Schroeder | |
| 2003/0002698 A1 | 1/2003 | Ludvigsen | |
| 2003/0078065 A1 | 4/2003 | Hoagland et al. | |
| 2003/0125090 A1 | 7/2003 | Zeira | |
| 2003/0227984 A1 * | 12/2003 | Batra et al. | 375/340 |
| 2004/0001588 A1 * | 1/2004 | Hairston | 379/419 |
| 2004/0032363 A1 | 2/2004 | Schantz et al. | |
| 2004/0062325 A1 | 4/2004 | England et al. | |
| 2004/0128382 A1 | 7/2004 | Shimoda et al. | |
| 2004/0164902 A1 | 8/2004 | Karlsson et al. | |
| 2004/0202339 A1 | 10/2004 | O'Brien, Jr. et al. | |
| 2004/0203797 A1 | 10/2004 | Burr | |
| 2004/0207465 A1 | 10/2004 | Nilsson | |
| 2004/0242250 A1 | 12/2004 | Sasai et al. | |
| 2004/0247023 A1 | 12/2004 | Sasai et al. | |
| 2004/0259449 A1 | 12/2004 | Onder de Linden et al. | |
| 2005/0025117 A1 | 2/2005 | Inagaki et al. | |
| 2005/0107104 A1 * | 5/2005 | Rajkotia | 455/502 |
| 2005/0113157 A1 | 5/2005 | Jaakola | |
| 2005/0138470 A1 | 6/2005 | Cromer et al. | |
| 2006/0016452 A1 | 1/2006 | Goetz et al. | |
| 2006/0026288 A1 | 2/2006 | Acharya et al. | |
| 2006/0028272 A1 | 2/2006 | Ozawa et al. | |
| 2006/0089138 A1 * | 4/2006 | Smith et al. | 455/426.1 |
| 2006/0146751 A1 * | 7/2006 | Obuchi et al. | 370/331 |
| 2006/0166663 A1 | 7/2006 | Haehnichen et al. | |
| 2006/0208794 A1 | 9/2006 | Morishima | |
| 2006/0281476 A1 * | 12/2006 | Lane et al. | 455/502 |
| 2007/0054643 A1 * | 3/2007 | Kraegeloh et al. | 455/255 |
| 2007/0073944 A1 | 3/2007 | Gormley | |
| 2007/0254728 A1 | 11/2007 | Moallemi et al. | |
| 2007/0279237 A1 | 12/2007 | Julian et al. | |
| 2008/0009275 A1 * | 1/2008 | Werner et al. | 455/414.2 |
| 2008/0043824 A1 | 2/2008 | Jacobs et al. | |
| 2008/0045161 A1 | 2/2008 | Lee et al. | |
| 2008/0279167 A1 | 11/2008 | Cardei et al. | |

FOREIGN PATENT DOCUMENTS

| | | |
|---|---|---|
| CN | 1723677 A | 1/2006 |
| EP | 851403 A2 | 7/1998 |
| EP | 1469594 A1 | 10/2004 |
| GB | 2388279 | 11/2003 |
| JP | 5180925 | 7/1993 |
| JP | 10190880 A | 7/1998 |
| JP | 11146030 A | 5/1999 |
| JP | 2001169345 | 6/2001 |
| JP | 2001344352 A | 12/2001 |
| JP | 2002290944 A | 10/2002 |
| JP | 2003202976 A | 7/2003 |
| JP | 2004029182 A | 1/2004 |
| JP | 2004507714 T | 3/2004 |
| JP | 2004357281 A | 12/2004 |
| JP | 2005005962 A | 1/2005 |
| JP | 2005020350 A | 1/2005 |
| JP | 2005099018 A | 4/2005 |
| JP | 2005128965 A | 5/2005 |
| JP | 2005295380 A | 10/2005 |
| JP | 2006054800 A | 2/2006 |
| JP | 2006054815 A | 2/2006 |
| JP | 2008503011 A | 1/2008 |
| KR | 20030008999 A | 1/2003 |
| TW | 200307141 | 12/2003 |
| TW | I247131 | 1/2006 |
| WO | WO0187014 A2 | 11/2001 |
| WO | WO0194974 | 12/2001 |
| WO | WO2004053655 A2 | 6/2004 |
| WO | WO2005083461 A1 | 9/2005 |
| WO | WO 2005121959 A2 | 12/2005 |
| WO | WO2006028547 A1 | 3/2006 |

OTHER PUBLICATIONS

Written Opinion, PCT/US07/067573, International Search Authority, European Patent Office, Feb. 12, 2008.

Vasudevan S. et al., "Design and Analysis of a Leader Election Algorithm for Mobile Ad Hoc Networks," Network Protocols, 2004, ICNP 2004, Proceedings of the 12th IEEE International Conference on Berlin, Germany, Oct. 5, 2004, pp. 350-360, XP010134836, IEEE, Piscataway, NJ, USA.

Sundararaman B. et al., "Clock Synchronization for Wireless Sensor Networks: a Survey," Ad Hoc Networks, Elsevier, May 2005, pp. 281-323, vol. 3, No. 3, University of Illinois, Chicago, IL, USA, XP004768539.

Sekine M. et al, "An Energy-Efficient Protocol for Active/Sleep Schedule Synchronization in Wireless Sensor Networks," IEEE 2006 Asia-Pacific Conference on Communications, Aug. 2006, pp. 1-5, XP031024251.

Kredo K. et al., "Medium Access Control in Wireless Sensor Networks," Computer Networks, Dec. 28, 2006, pp. 961-994, vol. 51, No. 4, Elsevier Science Publishers B.V., Amsterdam, NL, XP005817607.

International Preliminary Report on Patentability—PCT/US07/067573—International Search Authority, European Patent Office—Jul. 31, 2008.

European Search Report—EP08014015.5, Search Authority—Munich Patent Office—Sep. 17, 2008.

European Written Opinion—EP08014015.5, Search Authority—Munich Patent Office—Sep. 17, 2008.

European Search Report—EP08014016.3, Search Authority—Munich Patent Office—Sep. 17, 2008.

European Search Report—EP08014017.1, Search Authority—Munich Patent Office—Sep. 16, 2008.

European Search Report—EP080140157.1, Search Authority—Munich Patent Office—Sep. 16, 2008.

Chiasserini C F; Rao R R: "On the concept of distributed digital signal processing in wireless sensor networks" Oct. 7, 2002, pp. 260-264, XP010632110 IEEE Military Communications Conference. MILCOM 2002. Proceedings Anaheim, CA, Oct. 7.

Gulden P., et al., "Wireless local positioning" IEEE Microwave Magazine IEEE Service Center Piscataway NJ, USA, vol. 4 (4), Dec. 2003, pp. 77-86, XP011107180.

Ian Galton: "Delta-Sigma Data Conversion in Wireless Transceivers" IEEE Transactions on Microwave Theory and Techniques, IEEE Service Center, vol. 50, No. 1, Jan. 1, 2002, pp. 302-315, XP011038571.

Istepanian et al: "Guest Editorial Introduction to the Special Section on M-health: Beyond Seamless Mobility and Global Wireless Health-Care Connectivity" IEEE Transactions on Information Technology in Biomedicine, IEEE Service Center, vol. 8, No. 4, Dec. 2004, pp. 405-414, XP011122717.

Jones et al., "Modelling Mobile Health Systems: An Application of Augmented MDA for the Extended Healthcare Enterprise" EDOC Enterprise Computing Conference, 2005 Ninth IEEE International Enschede, The Netherlands, Sep. 19-23, 2005, Piscataway, NJ, USA, IEEE p. 58-69.

Magrath, A. J. et al.: "Hybrid Pulse Width Modulation/Sigma Delta Modulation Power Digital-to-Analogue Converter," IEEE Proceedings: Circuits Devices and Systems, Institution of Electrial Engineers, Stenvenage, GB, vol. 143, No. 3, Jun. 10, 1996, pp. 149-156.

Roboticsbased obstacleavoidance systems for the blind and visually impaired Navbelt and the guidecane, XP011095797.

Taiwanese Search report—096113704—TIPO—Jan. 9, 2011.

Taiwanese Search report—096114067—TIPO—Nov. 20, 2010.

Taiwanese Search report—096114874—TIPO—Aug. 23, 2010.

Taiwanese Search report—096115093—TIPO—Oct. 11, 2010.
Xu et al: "Distributed computing paradigms for collaborative signal and information processing in sensor networks" Aug. 1, 2004, Journal of Parallel and Distributed Computing, pp. 945-959, XP004525538.

Z. Shi, "Sigma-Delta ADS and DAC for Digital Wireless Communication." 1999 IEEE Radio Frequency Integrated Circuits Symposium, pp. 57-62.

* cited by examiner

METHODS AND APPARATUSES OF INITIATING COMMUNICATION IN WIRELESS NETWORKS

CLAIM OF PRIORITY UNDER 35 U.S.C. §119

The present application for patent claims priority to U.S. Provisional Patent Application No. 60/795,512, entitled "LOW DUTY CYCLE DEVICE INITIATED TIMING SYNCHRONIZATION," filed Apr. 26, 2006, assigned to the assignee hereof and hereby expressly incorporated by reference herein.

BACKGROUND

1. Field

This application relates generally to communications, and more specifically, to ultra-wide band communication.

2. Background

Wireless technologies enable communications between devices and may be employed for a variety of applications associated with various wireless communication networks such as personal area network ("PAN") and body area network ("BAN"). Synchronization of communications in such a network can consume substantial resources of a device. Thus, a need exists for alternative methods and apparatuses for communication synchronization.

SUMMARY

A summary of sample aspects of the disclosure follows. For convenience, one or more aspects of the disclosure may be referred to herein simply as "some aspects."

Method and apparatuses or devices of the invention each have several aspects, no single one of which is solely responsible for its desirable attributes. Without limiting the scope of this invention, for example, as expressed by the claims which follow, its more prominent features will now be discussed briefly. After considering this discussion, and particularly after reading the section entitled "Detailed Description" one will understand how the features of this invention provide advantages that include reduced consumption of power and/or other resources, for communication synchronization in, for example, an Ultra-wideband (UWB) network.

Some aspects include a method of communicating data. The method includes receiving information identifying at least one resource of a second electronic device, transmitting resource information of the electronic device, comparing the resource information of the electronic device and the received resource information of the second electronic device. The method may also include transmitting a synchronization signal to the second device based on the resource comparison. The method may also include receiving a synchronization signal from the second device subsequent to the resources comparison. Other aspects include systems, apparatuses, and devices for communicating data. For example, some aspects include devices such as headsets, watches, and medical devices configured to use such methods for communicating data.

DETAILED DESCRIPTION

The following detailed description is directed to certain specific aspects of the invention. However, the invention can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects communication channels between devices may be based on pulse position modulation. In some aspects, communication channels between devices may be based on a convolutional coding. In some aspects, communication channels may be based on pulse position modulation and convolutional coding.

Figure 1:
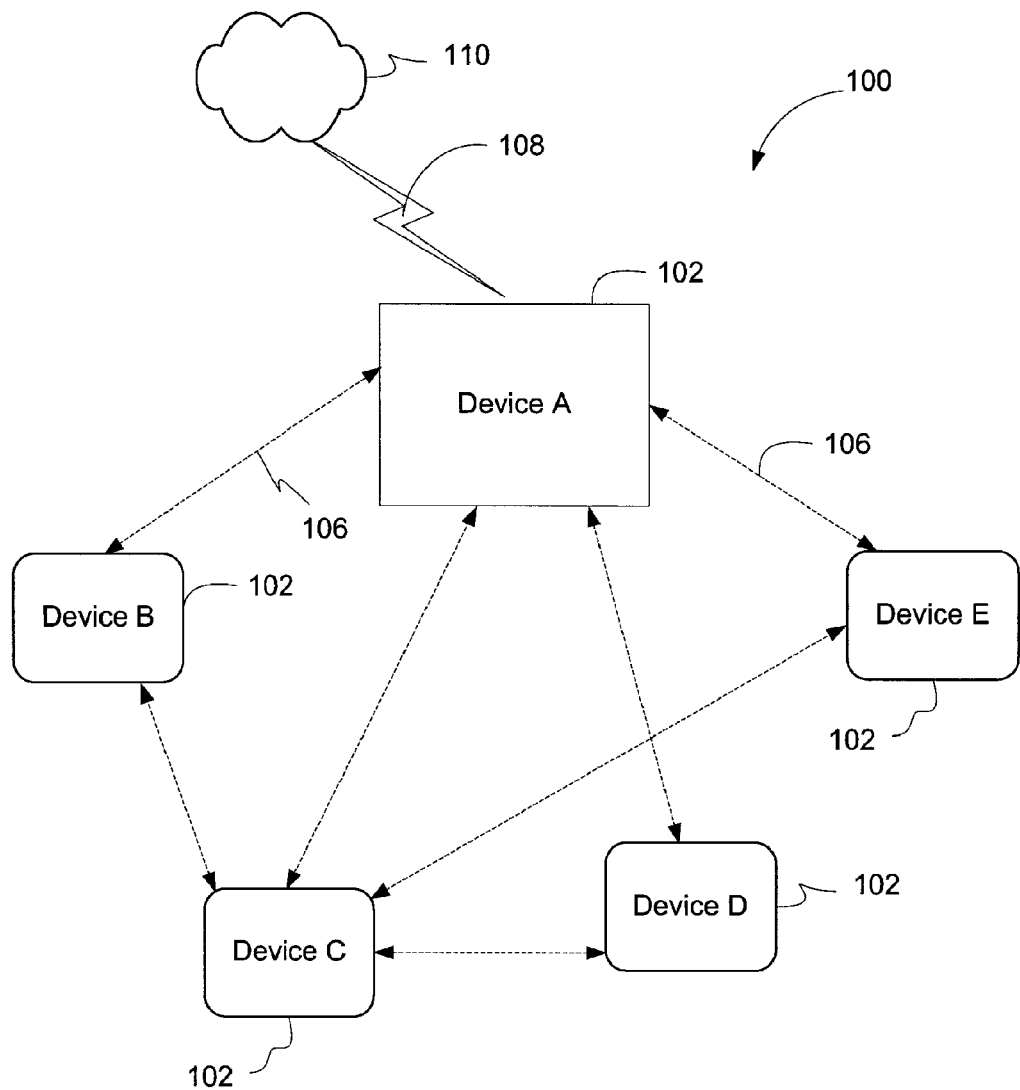
FIG. 1 is a block diagram illustrating an example system of wirelessly connected devices.

FIG. 1 is a block diagram illustrating an example system 100 of wirelessly connected devices 102 (e.g., labeled Device A, . . . , Device E). While five devices are shown in FIG. 1, examples of the system 100 may be configured to use any number of devices 102. The system 100 may comprise one or more of a personal area network (PAN) and/or a body area network (BAN). Each of the devices 102 may be configured to communicate via a wireless link 106. The system 100 may optionally include one or more devices 102 that comprise a longer range network interface, such as a mobile telephone, wireless Ethernet, a wired network, other suitable network interface, that is configured to communicate over a wireless link 108. The devices 102 may comprise devices such as headsets and watches (or other portable devices configured to display information such as caller id from a phone and/or messages (or portions thereof) such as email, short message system (SMS) messages, or any other type of data, including data received over the wireless links 106 and 108. Each of the devices 102 may communicate with one, two, or any number of the other devices 102.

One or more of the devices 102 may detect the presence of the other devices 102 when the other devices 102 initially communicate over the link 106. Two or more devices 102 may be paired through an exchange of messages over the link 106. For example, two devices 102 may pair when one of the two devices 102 first detects (by receiving a message over the wireless link 106) the other device 102. The pairing process may be based at least partly on a user's authorization of the pairing. The paired group of the devices 102 may define a particular personal or body area network.

As discussed further below, in some aspects the communications link 106 has a pulse-based physical layer. For example, the physical layer may utilize ultra-wideband pulses that have a relatively short length (e.g., on the order of a few nanoseconds) and a relatively wide bandwidth. In some aspects, an ultra-wide band may be defined as having a fractional bandwidth on the order of approximately 20% or more and/or having a bandwidth on the order of approximately 500 MHz or more. The fractional bandwidth is a particular bandwidth associated with a device divided by its center frequency. For example, a device according to this disclosure may have a bandwidth of 1.75 GHz with center frequency 8.125 GHz and thus its fractional bandwidth is 1.75/8.125 or 21.5%.

Those skilled in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 2:
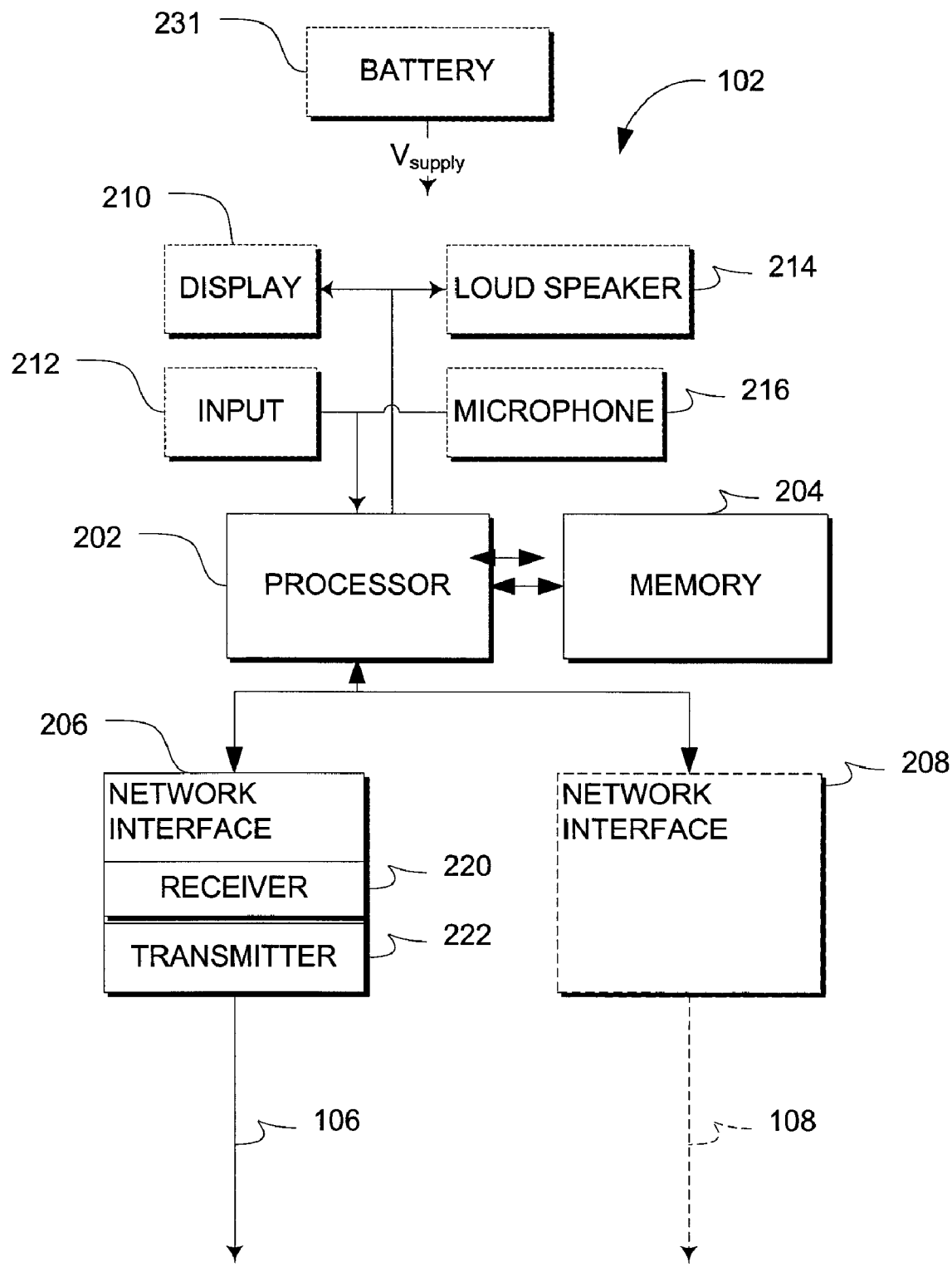
FIG. 2 is a block diagram illustrating an example of a wireless device such as illustrated in FIG. 1.

FIG. 2 is a block diagram illustrating an example of a wireless device 102. The device 102 includes a processor 202 that is in communication with a memory 204 and a network interface 206 for communicating via the wireless link 106. Optionally, the device 102 may also include one or more of a display 210, a user input device 212 such as a key, touch screen, or other suitable tactile input device, a loudspeaker 214 comprising a transducer adapted to provide audible output based on a signal received over the wireless link 106 and/or a microphone 216 comprising a transducer adapted to provide audible input of a signal that may be transmitted over the wireless link 106. For example, a watch may include the display 210 adapted to provide a visual output based on a signal received via the wireless communication link. A medical device may include one or more input devices 212 that include a sensor adapted to generate at least one sensed signal or sensed data to be transmitted via the wireless communication link 106.

The network interface 206 may include any suitable antenna (not shown), a receiver 220, and a transmitter 222 so that the exemplary device 102 can communicate with one or more devices over the wireless link 106. Optionally, the network interface 206 may also have processing capabilities to reduce processing requirements of the processor 202.

Optionally, the device 102 may include a second network interface 208 that communicates over the network 110 via a link 108. For example, the device 102 may provide connectivity to the other network 110 (e.g., a wide area network such as the Internet) via a wired or wireless communication link. Accordingly, the device 102 may enable other devices 102 (e.g., a Wi-Fi station) to access the other network 110. In addition, it should be appreciated that one or more of the devices 102 may be portable or, in some cases, relatively non-portable. The second network interface 208 may transmit and receive RF signals according to the IEEE 802.11 standard, including IEEE 802.11(a), (b), or (g), the BLUETOOTH standard, and/or CDMA, GSM, AMPS or other known signals that are used to communicate within a wireless cell phone network. In addition, the second network interface 208 may comprise any suitable wired network interface such as Ethernet (IEEE 802.3).

The device 102 may optionally include a battery 231 to provide power to one or more components of the device 102. The device 102 may comprise at least one of a mobile handset, a personal digital assistant, a laptop computer, a headset, a vehicle hands free device, or any other electronic device. In addition, the device 102 may comprise one or more of a biomedical sensor, biometric sensor, a pacemaker, or any other device for measuring or affecting a human body. In particular, the teachings herein may be incorporated into (e.g., implemented within or performed by) a variety of the devices 102. For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a biometric sensor (e.g., a heart rate monitor, a pedometer, an EKG device, a keyboard, a mouse, etc.), a user I/O device (e.g., a watch, a remote control, a light switch, etc.), a tire pressure monitor, a computer, a point-of-sale device, an entertainment device, a hearing aid, a set-top box, or any other suitable device.

The components described herein may be implemented in a variety of ways. Referring to FIG. 2, the device or apparatus 102 is represented as a series of interrelated functional blocks that may represent functions implemented by, for example the processor 202, software, some combination thereof, or in some other manner as taught herein. For example, the processor 202 may facilitate user input via the input devices 212. Further, the transmitter 222 may comprise a processor for transmitting that provides various functionalities relating to transmitting information to another device 102. The receiver 220 may comprises a processor for receiving that provides various functionality relating to receiving information from another device 102 as taught herein.

As noted above, FIG. 2 illustrates that in some aspects these components may be implemented via appropriate processor components. These processor components may in some aspects be implemented, at least in part, using structure as taught herein. In some aspects, a processor may be adapted to implement a portion or all of the functionality of one or more of these components. In some aspects one or more of the components represented by dashed boxes are optional.

In some aspects, the device or apparatus 102 may comprise an integrated circuit. Thus, the integrated circuit may comprise one or more processors that provide the functionality of the processor components illustrated in FIG. 2. For example, in some aspects a single processor may implement the functionality of the illustrated processor components, while in other aspects more than one processor may implement the functionality of the illustrated processor components. In addition, in some aspects the integrated circuit may comprise other types of components that implement some or all of the functionality of the illustrated processor components.

Figure 3:
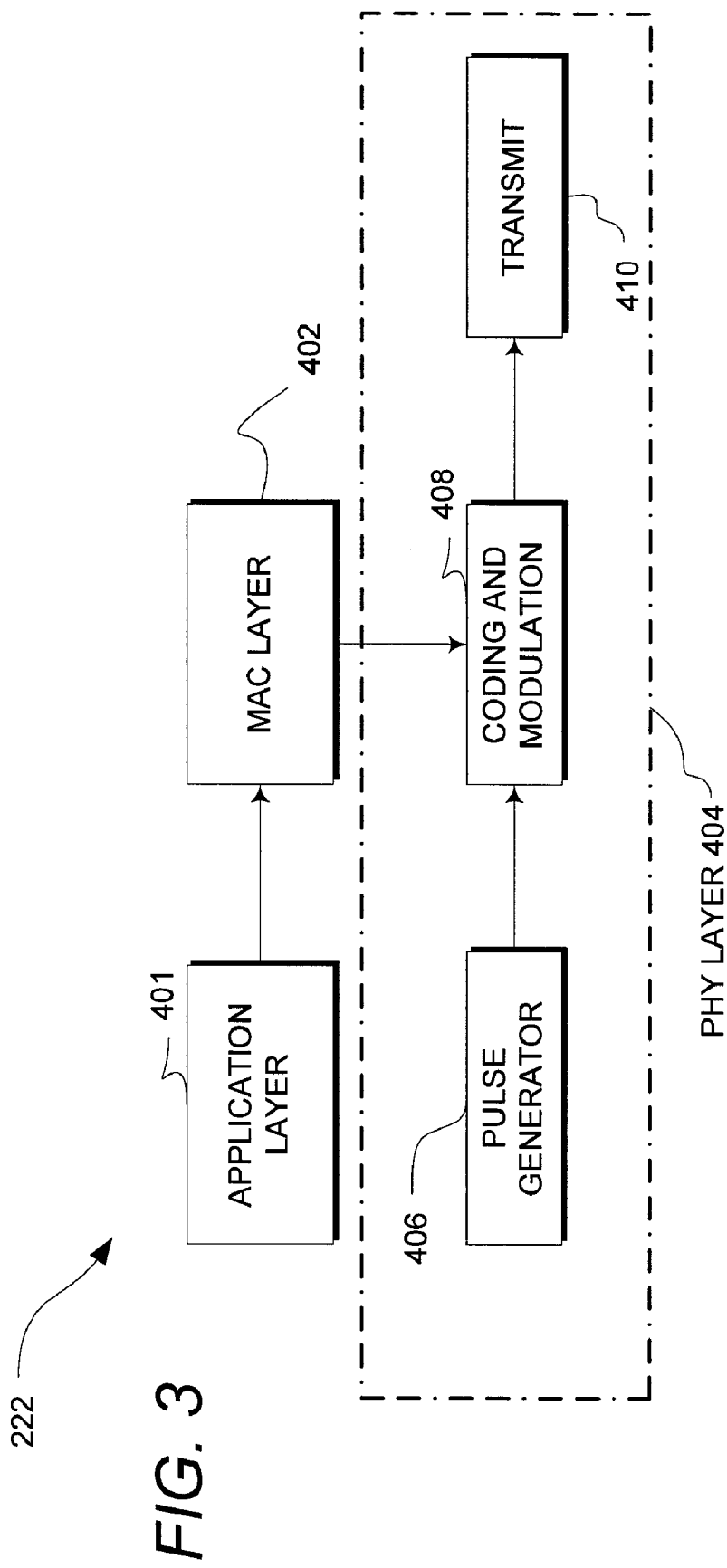
FIG. 3 is a block diagram illustrating a transmitter of a device such as illustrated in FIG. 2.

FIG. 3 is a block diagram illustrating an example of the transmitter 222 of the device 102. As would be apparent to one of skill in the art, in the illustrated block diagram of FIG. 3, logical modules of the device 102 are illustrated in terms of a layered, abstract description for a communications network. As noted below, each layer may comprise one or more logical modules that may be implemented in software, hardware, or any suitable combination of both. The transmitter 222 may include (i) an application layer 401 that provides information to a data link or media access control (MAC) layer 402 for transmission, (ii) a media access control (MAC) layer 402 that receives data from the application layer 401 and provides it to a physical layer 404, and (iii) a physical (PHY) layer 404 that receives data from the MAC layer 402 and transmits the data over the wireless channel 106. In the illustrated transmitter 222, the PHY layer includes a pulse generator 406, a coding and modulation block 408, and a transmit block 410. A phase locked loop (PLL) (not shown) may provide timing signals to the PHY layer. The pulse generator 406 generates waveforms such as Gaussian pulse waveforms. The coding and modulation block 408 codes the information signal provided by the MAC layer 402 using a coding scheme such as convolutional coding, block coding or concatenated coding and modulates the pulse signal based on the coded information signal using a scheme such as pulse position modulation, pulse amplitude modulation, or transmitted reference modulation. The transmit block 410 transmits the modulated pulse signal. Functions of the transmit block 410 may include amplifying the modulated pulse signal for transmission and providing the signal to an antenna.

Figure 4:
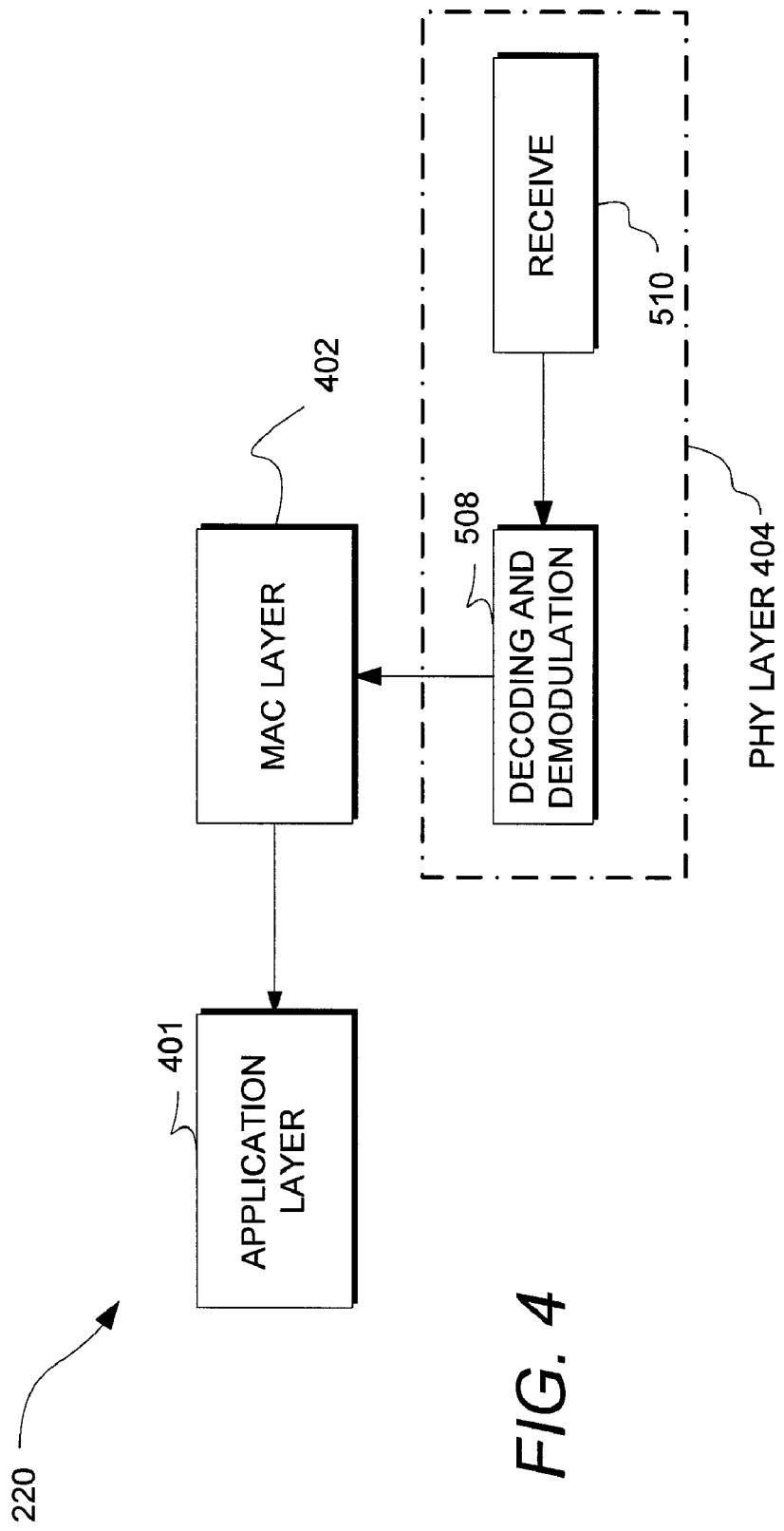
FIG. 4 is a block diagram illustrating a receiver of a device such as illustrated in FIG. 2.

FIG. 4 is a block diagram illustrating an example of the receiver 220 of the device 102. As would be apparent to one of skill in the art, in the illustrated block diagram of FIG. 4, logical modules of the device 102 are illustrated in terms of a layered, abstract description for a communications network. As noted below, each layer may comprise one or more logical modules that may be implemented in software, hardware, or any suitable combination of both. In FIG. 4, the receiver 220 includes the application layer 401 and the MAC layer 402. The PHY layer 404 is in communication with the MAC layer 402. The PHY layer 404 of the receiver includes a demodulation and decoding block 508 and a receive block 510. The receive block 510 may include components (not shown) that may comprise an antenna, a power amplifier, and other suitable receiver components. The receive block 510 receives a wireless signal and provides that signal to the demodulation and decoding block 508, which demodulates and decodes the signal and provides received data to the MAC layer 402.

The receiver 220 and the transmitter 222 may employ a variety of wireless physical layer schemes. For example, the physical layer 404 of the receiver 220 and the transmitter 222 may utilize some form of CDMA, TDMA, OFDM, OFDMA, or other modulation and multiplexing schemes.

Power and processor consumption during acquisition and synchronization between devices 102 in the system 100 can be substantial for devices 102 having a low duty cycle, e.g., a low duty cycle device (LDD). A low duty cycle device refers to a device that transmits or receives data only for a relatively small percentage of time that it is in operation. For example a health sensor, may have to execute the synchronization and acquisition operations very often compared to the amount of time it would otherwise be powered and operating. In some aspects, a method and apparatus are provided for reducing power and processor consumption for such acquisition and synchronization.

In one example of the system 100, a particular device 102 may comprise a network controller device (NCD), for example a cell phone. The NCD 102 may transmit a beacon comprising a synchronization signal at regular intervals. When a particular device 102, e.g., a LDD, wakes up, it searches for the beacon to synchronize to the system. To mitigate the effect of inaccuracies in timing, the LDD may have to operate a tracking loop to avoid too much drift. The associated cost in power and processing resources may be significant for some devices 102.

It is to be recognized that the designation of a particular device 102 as an NCD or an LDD is merely for purposes of description of the roles that devices 102 in the system 100 may perform. In particular, particular devices 102 may act as NCDs with respect to one or more other devices 102 and act as LDDs with respect to one or more other devices. Moreover, the roles of NCD and LDD devices may change over time based on changes in available resources. For example, an NCD and LDD may exchange roles when the battery of the NCD discharges beyond a specified level.

In particular, the devices 102 may transmit and receive messages indicative of resource information with other devices 102 in a particular system 100. Each device 102 may compare the resource information it receives from the other devices 102 with its own resource information to determine whether to act as a NCD or an LDD with reference to particular other devices. In one example of the system 100, such resource information is exchanged when the devices 102 are paired to define the system 100. In one example of the system 100, the resource information may also (or alternatively) be shared (and updated) periodically to allow devices 102 to change roles, for example, as their batteries discharge at different rates or as devices 102 are added or removed from the system 100.

Particular devices 102, e.g., NCDs, may have more lenient power and rate constraints than other devices 102 in the system 100. For example, a particular device 102 may comprise a LDD such as a health sensor that is configured to operate for a few months or year without change of battery. For such devices 102, it is desirable to transfer the burden of the synchronization procedure to other devices 102 including devices configured as NCDs.

In one example of the system 100, a particular device such as an LDD initiates a transmission procedure. For example, when the LDD 102 wakes up and has data to transfer or when it is woken up remotely by the another device 102 (e.g., a NCD), the LDD devices 102 sends a synchronization signal to the NCD 102 via the communication link 106. The synchronization signal may comprise a preamble sequence. The NCD 102 initiates acquisition and synchronization procedures and obtains the timing parameters of the LDD based on the preamble sequence.

In one example of the system 100, the NCD 102 may then regularly adjust its timing parameters to match the LDD parameters, thereby allowing the LDD 102 to continue transmitting without any timing parameter adjustments. In another example of the system 100, the NCD 102 may alternatively (or additionally) communicate regular timing updates to the LDD 102. In such examples of the system 100, the LDD 102 adjusts its timing parameters based on these updates. In one example of the system 100, the NCD 102 may communicate with multiple devices 102 including other LDDs 102 by maintaining multiple sets of timing data, e.g., a different set for each LDD.

After transmitting the synchronization signal, the LDD 102 may listen to the communications link 106 for a period of time in expectation of receiving an acknowledgement transmitted back using substantially the same timing parameters such as the timing offset. If it does not receive any valid response, it may go back to sleep, or repeat the message at a suitable interval.

After receiving the synchronization signal, the NCD 102 may transmit a message providing an offset to the LDD 102 to transmit at a different time offset. This message can instruct the LDD 102 to shift communication to a specific channel. Further, the NCD 102 may transmit messages providing data related to broadcast time based modes.

Moreover, the NCD 102 may provide channel and timing assignments to the LDD 102. The NCD 102 may provide timing data updates to the LDD 102 to reduce interference. In addition, the NCD 102 may assign channels to LDDs 102 that reduce interference when those LDDs 102 communicate concurrently with the NCD 102 or with other LDDs 102.

Figure 5:
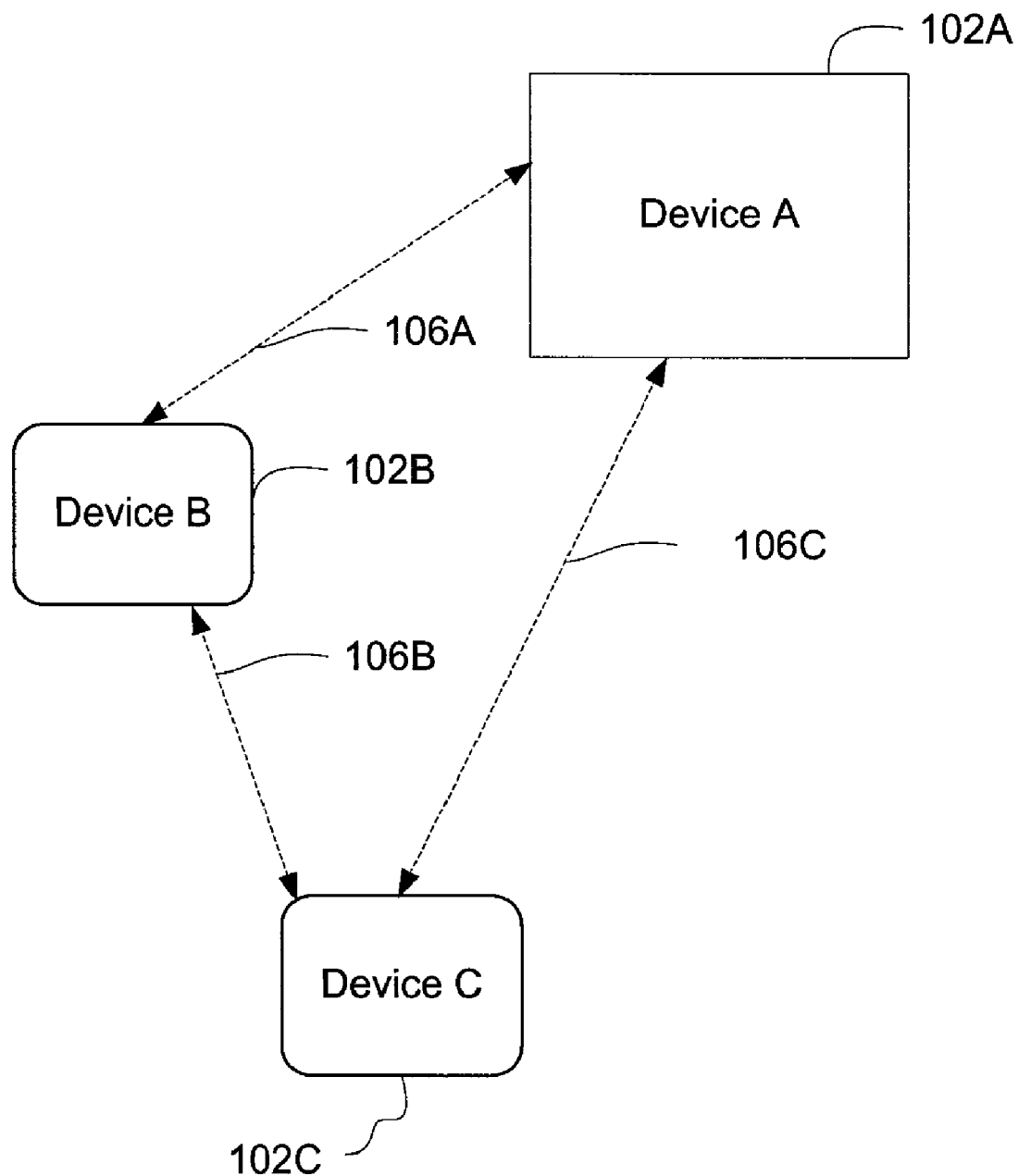
FIG. 5 is a block diagram illustrating another example system of wirelessly connected devices.

FIG. 5 is a block diagram illustrating another example system 100 of wirelessly connected devices 102. Other examples of the system 100 may have any number of devices. In particular, FIG. 5 illustrates three devices 102, devices 102A, 102B, and 102C. The device 102A communicates with device 102B via a wireless link 106A and with the device 102C via a wireless link 106C. The device 102B may also communicate with the device 102C via a wireless link 106C. Each of the wireless links 106A may use the same or different communication parameters (e.g., timing offsets and channels).

For illustration, the device 102A may be a NCD while devices 102B and 102C are LDDs. In operation in such a system, each of the devices 102B and 102C transmit their resource information to the device 102A. This resource information can be transmitted when the devices 102A, 102B, and 102C are paired and/or periodically. The device 102A may also transmit its resource information to one or both of the devices 102B and 102C. In one example of the system 100, each of the devices compares its resources to the received resources from the other devices 102 to determine which device transmits a synchronization signal and which should be configured to receive the synchronization signal. The device 102, e.g., device 102A, that is to receive the synchronization signal waits for a synchronization signal such as beacon signal to be transmitted by the device 102B. The device 102B may transmit the synchronization signal to resynchronize with the device 102A, e.g., after the device 102B has been in sleep mode.

In another example of the system 100, certain specified devices, e.g., NCD devices such as the device 102A, perform the comparison and provide instructions, e.g., at pairing, as to whether a particular LDD device such as LDD 102B and 102C should transmit synchronization signals or should be configured to receive such signals, e.g., from the NCD 102A.

In one example of the system 100, the LDDs 102B and 102C may be configured to communicate with each other via the wireless link 106B based on timing and other synchronization data provided by the NCD 102A. For example, both LDDs 102B and 102C may be configured to send synchronization signals to the NCD 102A to establish communication channels 106A and 106C. One or both of the LDDs 102B and 102C may be configured to receive timing and other synchronization information for their shared wireless link 106B from the NCD 102A via the wireless links 106A and 106C. In one example of the system 100, the NCD 102A is configured to transmit messages assigning one or more orthogonal or quasi-orthogonal channels having low interference to LDD devices 102B and 102C. The NCD device 102A can thus provide timing updates to the LDDs 102 to reduce interference in communications between the LDD devices 102A and 102B.

In some examples of the system 100, the NCD 102 may track the LDD 102 when there are many NCDs 102 receiving data from a particular LDD 102. For example, in one example system 100, a particular LDD may relay communications between two portions of a PAN (e.g., between two or more subnets) each having a different NCD 102. In such a system 100, the LDD 102 may determine that it is most efficient for it to generate synchronization and timing for communication to each of the NCDs 102. Thus, the LDD 102 transmits synchronization (e.g., beacon) signal to each of the NCDs 102. Each NCD receives a synchronization signal, performs a synchronization procedure based on the received signal, and tracks the timing of the LDD.

Accordingly, in some aspects, resource consumption associated with acquisition and synchronization can be shifted between devices 102 in the system 100, e.g., from devices 102 that have small power or other resource capabilities to more capable devices 102.

Figure 6:
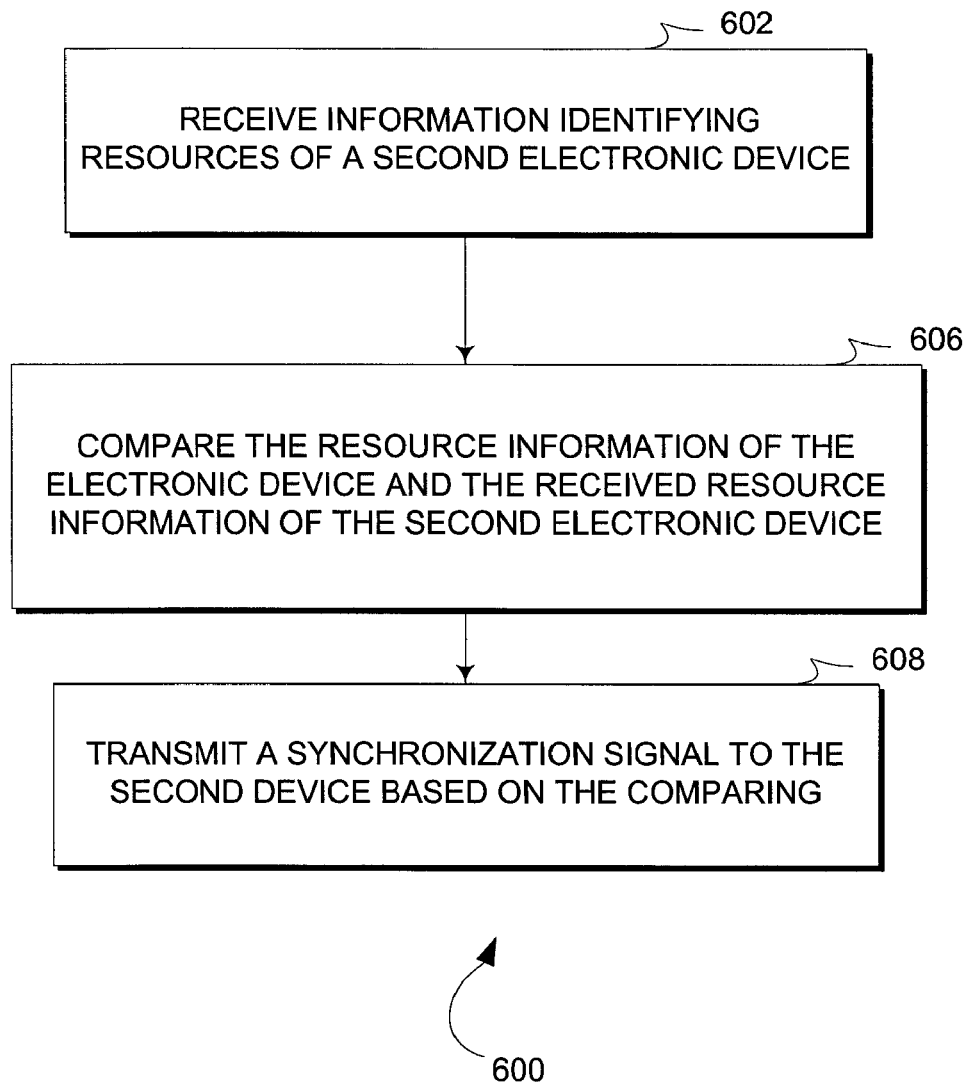
FIG. 6 is a flowchart illustrating an example of a method of communicating data such as in the example system such as illustrated FIG. 1.

FIG. 6 is a flowchart illustrating an example of a method 600 of communicating data such as in the example system 100. The method 600 begins at a block 602 in which the receiver 220 of a first device 102 receives information identifying resources of a second electronic device 102. The transmitter 222 of the first device 102 may also transmit resource information of the first electronic device 102, e.g., to the second electronic device 102. The resource information may include one or more of power resource information and processing resource information. Power resource information may include information relating to the charge status of the battery 231 and the fully charged capacity of the battery 231. The resource information may also include duty cycle information, e.g., whether the device has a resource consumption profile of a low duty cycle device such as a medical device or sensor that wakes periodically to make and transmit a sensor reading. Processing resource information may include, for example, information about the capabilities of the processor 202 and/or the memory 204. The resource information received at the block 602 and transmitted in the block 604 may comprise data in a paring message.

Moving to a block 606, the processor 202 compares the resource information of the electronic device and the received resource information of the second electronic device. For example, the processor 202 may compare resources and determine that the first electronic device has fewer of at least one resource than the second electronic device, e.g., fewer power resources in the form of less battery capacity or reserves. As noted above, the comparison may be performed once at pairing of the first and second devices 102 or each time the first and second devices 102 enter the system 100. Alternatively, or in addition, the devices 102 may exchange resource information periodically so that which device 102 has fewer resources may change over time. In another example, the processor 202 may use a multifactor or weighted comparison of resource information. For example, the comparison may be based on raw resource data (e.g., the battery capacity or reserves of each device), derived data based on resource data (e.g., battery lifetime based on duty cycle data of each device, or battery lifetime desired by each device in view of its duty cycle). Thus, for example, a health sensor device 102 may have a large battery capacity but a low expected duty cycle such that the comparison may identify the health sensor device 102 has fewer resources than a cell phone device 102 that has a similar battery capacity but a higher duty cycle.

In one example of the system 100, each of the first and second devices 102 performs the same or a corresponding comparison according to a predetermined protocol such that each device 102 determines whether to transmit or receive the synchronization signal. In another example, the comparison is performed during pairing, or when each of the devices 102 communicates, with data indicative of the results of the comparison communicated to each device 102 to determine which device 102 transmits and which device 102 receives the synchronization signal. In one example of the system 100, a third device 102 receives resource information of each of the first and second devices 102, performs the comparison, makes a determination as to which device 102 should transmit the synchronization signal and provides the devices 102 with that determination.

Proceeding to a block 608, the transmitter 222 transmits a synchronization signal to the second device subsequent to the comparing of block 606. For example, in one example of the system 100, maintaining timing data for communicating with a second electronic device may be costly in terms of power consumption and increased duty cycle to receive such data. A low duty cycle device 102 may reduce such overhead by transmitting a synchronization signal to another device 102 such that the receiving device 102 determines and maintains communication synchronization, e.g., configures itself to use the transmitters timing parameters. In such an example device, the transmitter 222 of the first device 102 may be configured to transmit the synchronization signal when the electronic device 102 has fewer power or battery resources than the second electronic device 102 and thus would benefit from reduced receiving and transmission overhead of maintaining timing synchronization with the second electronic device 102. The synchronization signal may include a beacon signal. The first device 102 may additionally receive and transmit data to the second device 102 based on timing and other synchronization data communicated or derived from the synchronization signal.

Figure 7:
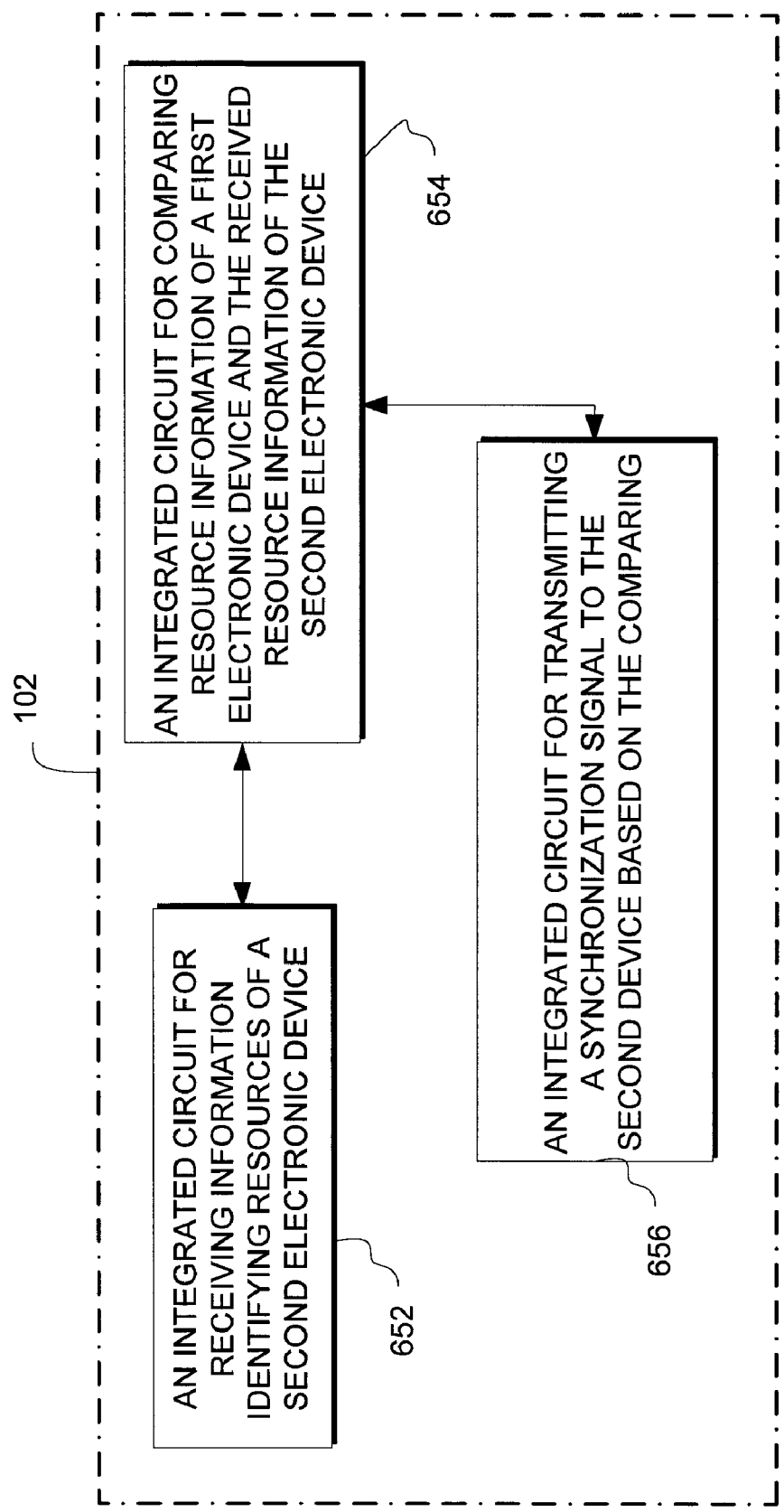
FIG. 7 is a block diagram illustrating an example of a device that transmits data using a method such as illustrated in FIG. 6.

FIG. 7 is a block diagram illustrating an example of the device 102 that communicates using the method 600 of FIG. 6. In the illustrated example, the device 102 comprises a means or an integrated circuit (IC) 652 for receiving information identifying resources of a second electronic device 102. The IC 652 may comprise the receiver 220 of FIGS. 2 and 4. The device 102 also comprises a means or an IC 654 for comparing resource information of the electronic device 102 and the received resource information of the second electronic device 102. The IC 654 may comprise the processor 202 of FIG. 2. The device 102 also comprises a means or an IC 656 for transmitting a synchronization signal to the second device subsequent to the comparing performed by the IC 654. The IC 656 may comprise the transmitter 222 of FIGS. 2 and 3. The IC 565 may also be configured to transmit the resource information of the electronic device 102.

Figure 8:
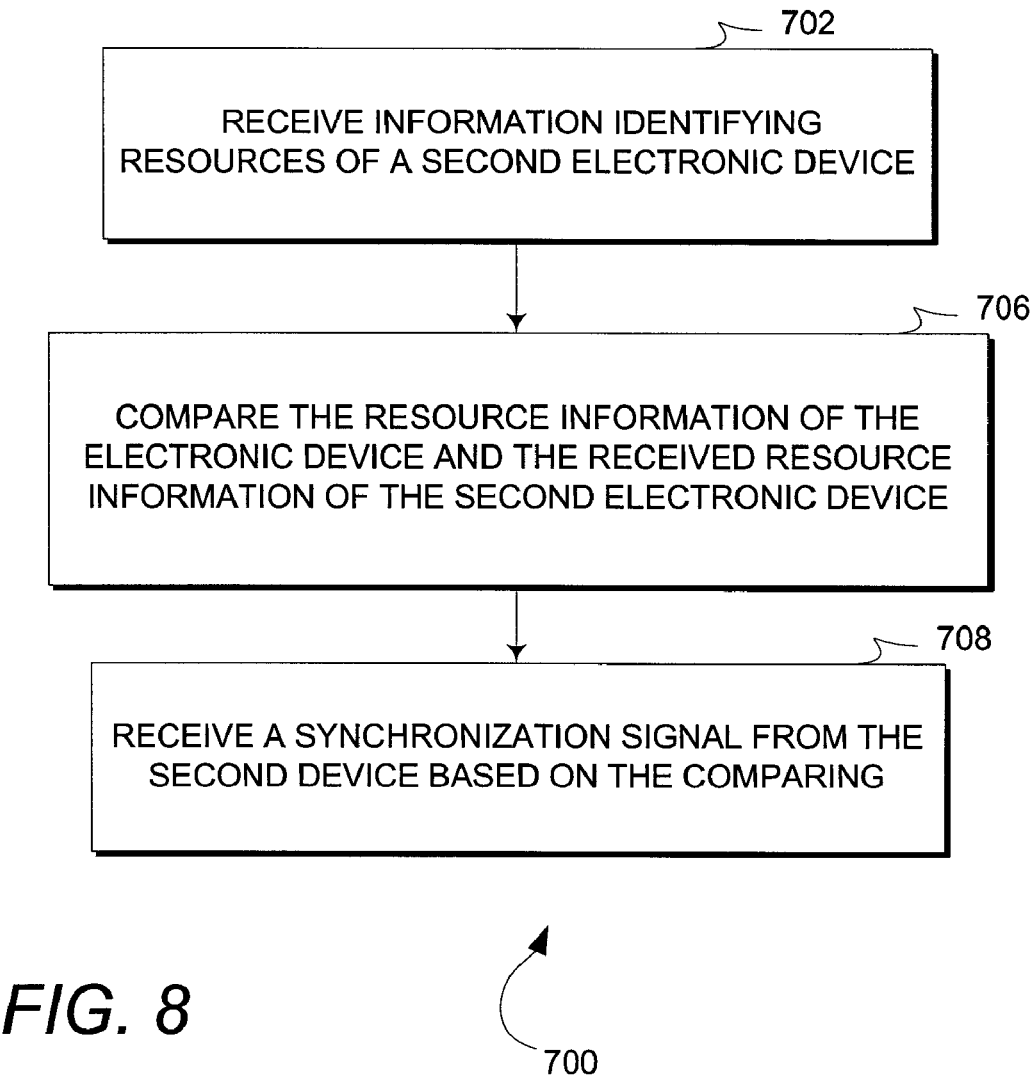
FIG. 8 is a flowchart illustrating another example of a method of communicating data such as in the example system such as illustrated FIG. 1.

FIG. 8 is a flowchart illustrating an example of a method 700 of communicating data such as in the example system 100. The method 700 begins at a block 702 in which the receiver 220 of a first device 102 receives information identifying resources of a second electronic device 102. The resource information may include one or more of power resource information and processing resource information. Power resource information may include information relating to the charge status of the battery 231 and the fully charged capacity of the battery 231. The resource information may also include duty cycle information, e.g., whether the device has a resource consumption profile of a low duty cycle device such as a medical device or sensor that wakes periodically to make and transmit a sensor reading. Processing resource information may include, for example, information about the capabilities of the processor 202 and/or the memory 204. The resource information may comprise data received in a pairing message. The transmitter 222 of the first device 102 may also transmit resource information of the first electronic device 102.

Moving to a block 706, the processor 202 compares the resource information of the electronic device and the received resource information of the second electronic device. For example, the processor 202 may determine that the first electronic device has more of at least one resource than the second electronic device, e.g., more power resources in the form of greater battery capacity or reserves. Proceeding to a block 708, the receiver 222 receives a synchronization signal from the second device subsequent to the comparing of block 606. For example, in one example of the system 100, maintaining timing or other synchronization data in the second electronic device may be costly in terms of power consumption and increased duty cycle to receive such data. A low duty cycle device 102 may reduce such overhead by transmitting a synchronization signal to another device 102 such that the receiving device 102 determines and maintains communication synchronization, e.g., configures itself to use the transmitters timing parameters. In such an example device, the receiver 220 of the receiving device 102 may be configured to receive the synchronization signal when the electronic device 102 has greater power or battery resources than the second electronic device 102 and thus overall system performance benefits from reduced receiving and transmission overhead of maintaining timing synchronization with the second electronic device 102. The synchronization signal may include a beacon signal. The receiving device 102 may additionally receive and transmit data to the second, e.g., low-duty cycle, device 102 based on timing and other synchronization data communicated or derived from the synchronization signal received from the second electronic device.

Figure 9:
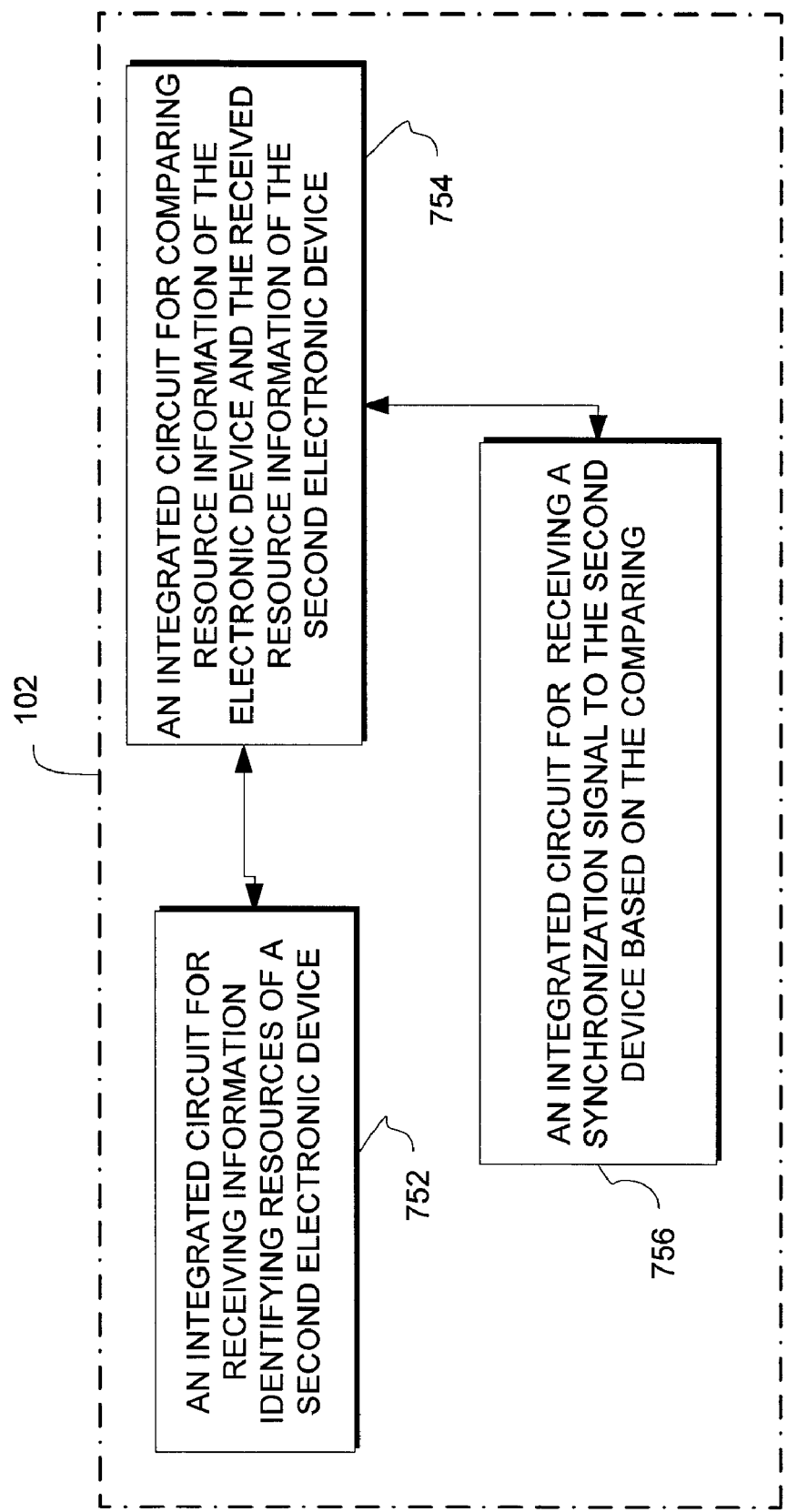
FIG. 9 is a block diagram illustrating an example of a device that transmits data using a method such as illustrated in FIG. 8.

FIG. 9 is a block diagram illustrating an example of the device 102 that communicates using the method 700 of FIG. 8. In the illustrated example, the device 102 comprises a means or an integrated circuit (IC) 752 for receiving information identifying resources of a second electronic device 102. The IC 752 may comprise the receiver 220 of FIGS. 2 and 4. The device 102 also comprises a means or an IC 754 for comparing resource information of the electronic device 102 and the received resource information of the second electronic device 102. The IC 754 may comprise the processor 202 of FIG. 2. In addition, the IC 752 may comprise a means of receiving a synchronization signal transmitted from the second device subsequent to the comparing performed by the IC 754. The device 102 may also comprise a means or an IC (not shown) for transmitting the resource information of the electronic device 102. Such a transmitting means may comprise the transmitter 222 of FIGS. 2 and 3.

Figure 10:
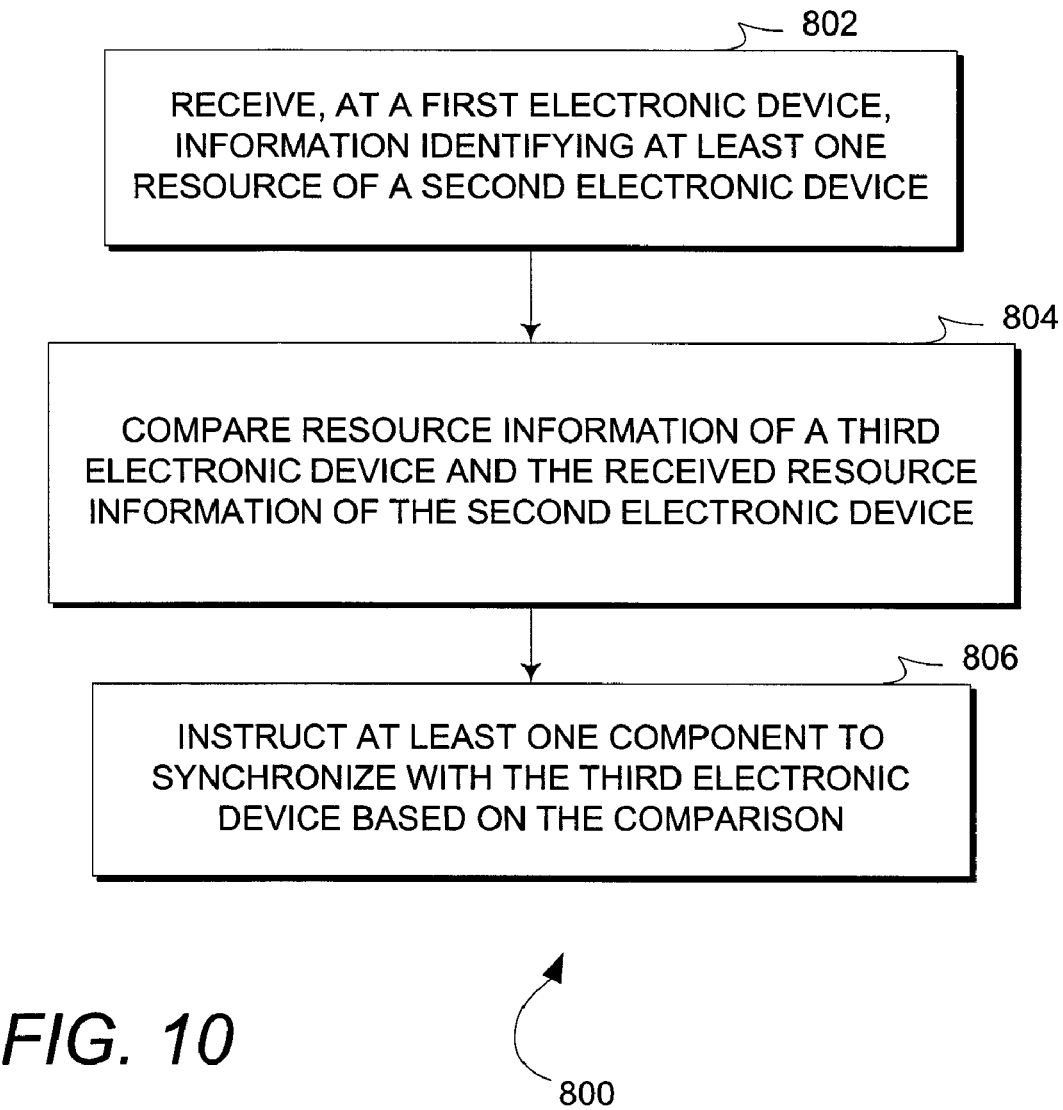
FIG. 10 is a flowchart illustrating another example of a method of communicating data such as in the example system such as illustrated FIG. 1.

FIG. 10 is a flowchart illustrating an example of a method 800 of communicating data such as in the example system 100. The method 800 begins at a block 802 in which the receiver 220 of a first device 102, e.g., the device 102a of FIG. 5, receives information identifying resources of a second electronic device 102b. Next at a block 804, the processor 202 (e.g., of the device 102a) compares resource information of a third electronic device 102c and the received resource information of the second electronic device 102b. Moving to a block 806, the processor 204 of instructs at least one component to synchronize with the third electronic device 102c based on the comparison. The component may comprise a portion (e.g., the processor 202, the receiver 220, or the transmitter 222) of the device 102b or the device 102a.

Figure 11:
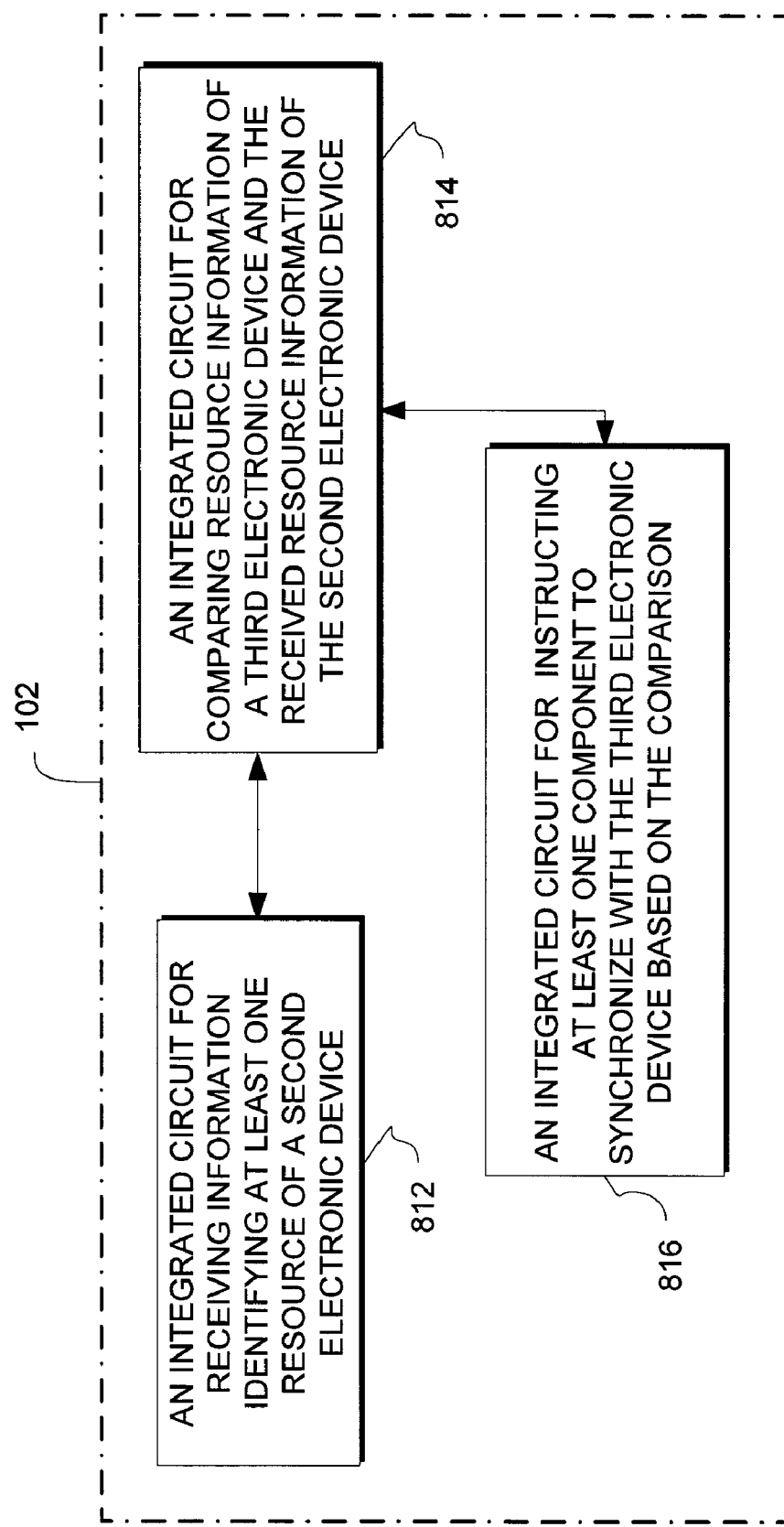
FIG. 11 is a block diagram illustrating an example of a device that transmits data using a method such as illustrated in FIG. 10.

FIG. 11 is a block diagram illustrating an example of the device 102 that communicates using the method 800 of FIG. 10. In the illustrated example, the device 102, e.g., the device 102a of FIG. 5, comprises a means or an integrated circuit (IC) 812 for receiving information identifying resources of a second electronic device 102. The IC 812 may comprise the receiver 220 of FIGS. 2 and 4. The device 102 also comprises a means or an IC 814 for comparing resource information of a third electronic device 102c and the received resource information of the second electronic device 102b. The IC 814 may comprise the processor 202 of FIG. 2. The device 102 also comprises a means or an IC 816 for instructing at least one component to synchronize with the third electronic device 102c based on the comparison. The component may comprise a portion (e.g., the processor 202, the receiver 220, or the transmitter 222) of the device 102b or the device 102a. The instructing means may comprise the processor 202 and, optionally, the transmitter 222 of FIGS. 2 and 3.

Figure 12:
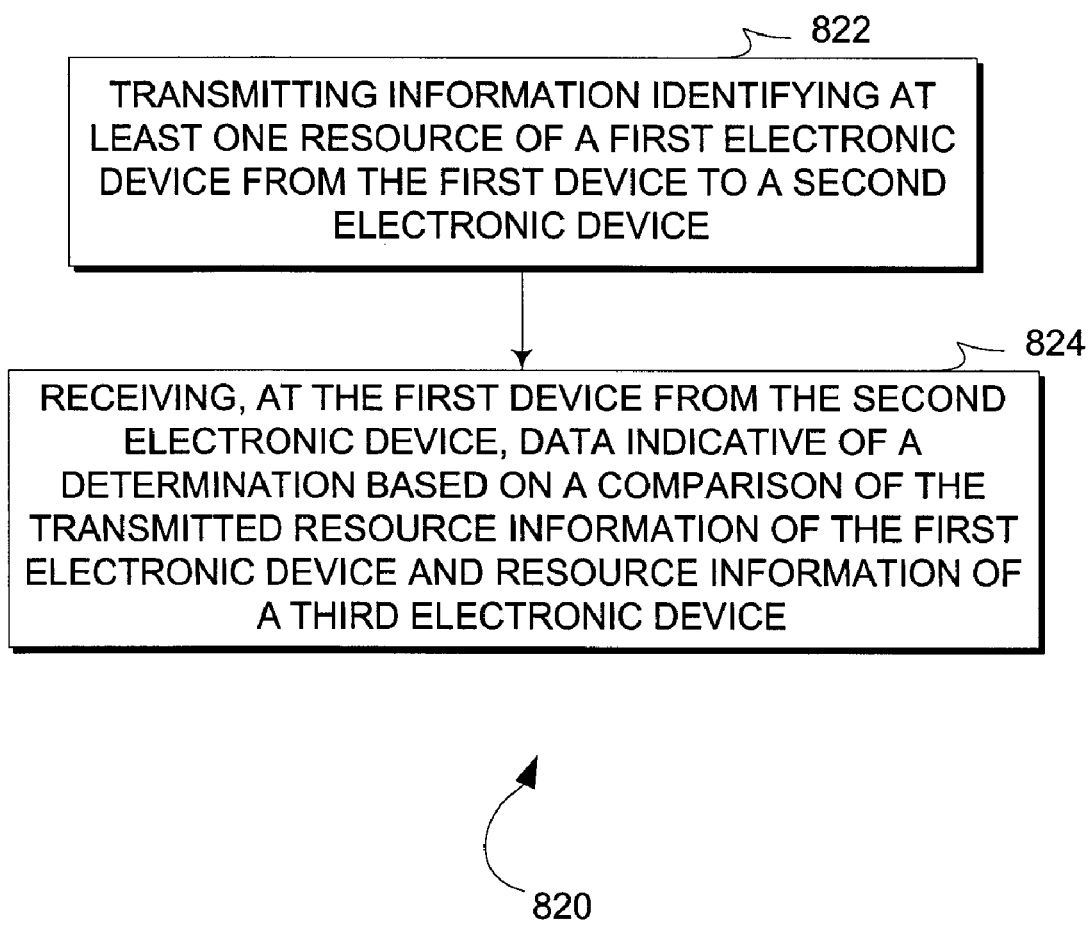
FIG. 12 is a flowchart illustrating another example of a method of communicating data such as in the example system such as illustrated FIG. 1.

FIG. 12 is a flowchart illustrating an example of a method 820 of communicating data such as in the example system 100. The method 820 begins at a block 822 in which the transmitter 222 of a first device 102, e.g., the device 102b of FIG. 5, transmits information identifying at least one resource of a first electronic device 102b from the first device 102b to a second electronic device 102a. Next at a block 824, the receiver 220 of the device 102b receives, from the second electronic device 102a, data indicative of a determination based on comparing the transmitted resource information of the first electronic device 102b and resource information of a third electronic device 102c.

Figure 13:
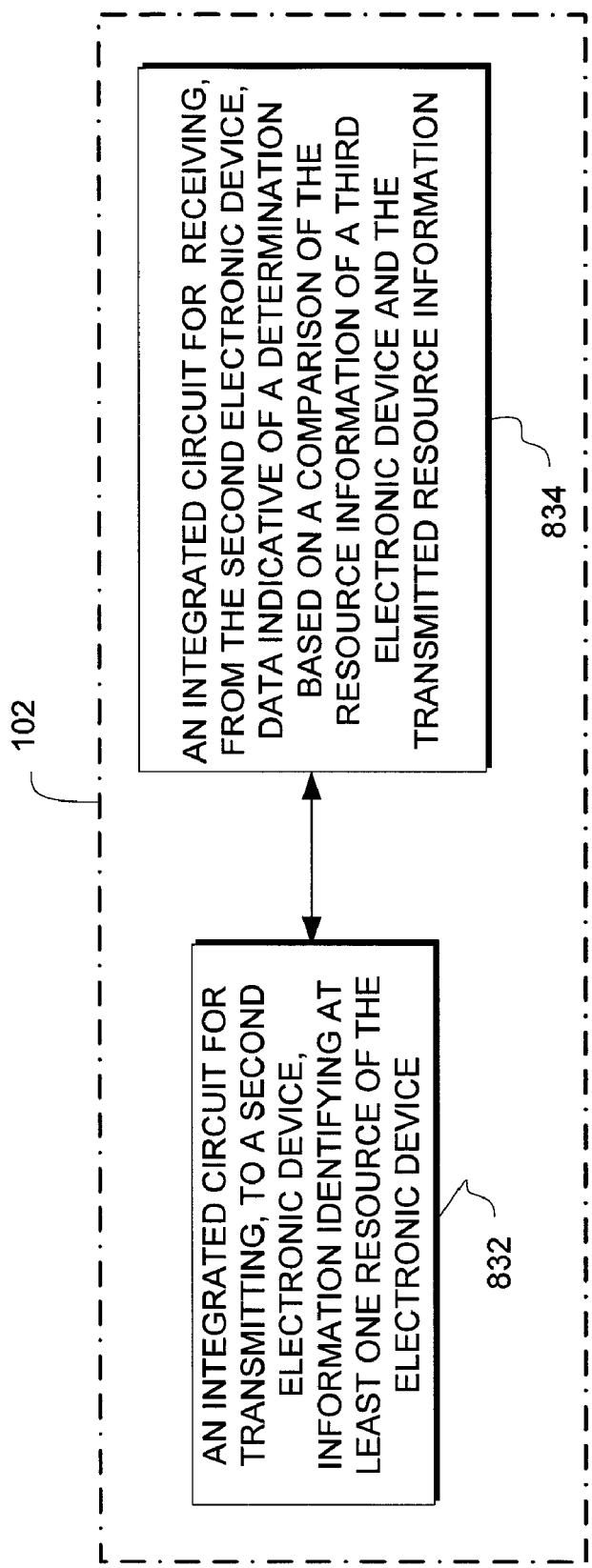
FIG. 13 is a block diagram illustrating an example of a device that transmits data using a method such as illustrated in FIG. 12.

FIG. 13 is a block diagram illustrating an example of the device 102 that communicates using the method 820 of FIG. 12. In the illustrated example, the device 102, e.g., the device 102b of FIG. 5, comprises a means or an integrated circuit (IC) 832 for transmitting, to a second electronic device 102a, information identifying at least one resource of the electronic device 102b. The IC 832 may comprise the transmitter 222 of FIGS. 2 and 3. The device 102 also comprises a means or an IC 834 for receiving, from the second electronic device 102a, data indicative of a determination based on comparing the resource information of a third electronic device 102c and the transmitted resource information of the device 102b. Such a receiving means may comprise the receiver 220 of FIGS. 2 and 4.

In view of the above, one will appreciate that the disclosure addresses how to communicate data, such as a UWB system. For example, the illustrated aspects provide a lower overhead method and apparatus of multi-hop communications. For example, power consumption on a low duty cycle device can be reduced by minimizing overhead for receiving and maintaining synchronization with other devices.

Any illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various aspects, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description, or both. All changes which come within the meaning and range of equivalency of the claims are to be embraced within their scope.

The invention claimed is:

1. A method of wireless communications, comprising:
   receiving, at a first electronic device, information identifying at least one resource of a second electronic device;
   comparing resource information of the first electronic device and the received resource information of the second electronic device; and
   transmitting, at the first electronic device, a synchronization signal to the second electronic device if at least one resource of the first electronic device is less than at least one resource of the second electronic device based on the comparison.

2. The method of claim 1, further comprising transmitting the resource information of the first electronic device to the second electronic device.

3. The method of claim 1, further comprising periodically transmitting the resource information of the first electronic device to the second electronic device.

4. The method of claim 1, wherein the synchronization signal comprises a beacon signal.

5. The method of claim 1, wherein the resource information of each of the first and second electronic devices comprises power resource information.

6. The method of claim 1, wherein the resource information of each of the first and second electronic devices comprises processing resource information.

7. The method of claim 1, wherein the synchronization signal comprises at least one timing parameter.

8. The method of claim 1, further comprising receiving data transmitted from the second electronic device in response to the transmitted synchronization signal.

9. The method of claim 8, wherein the data comprises at least one timing parameter.

10. The method of claim 1 further comprising transmitting the resource information of the first electronic device in response to a pairing message from another device.

11. The method of claim 1, wherein the synchronization signal comprises at least one pulse.

12. The method of claim 11, wherein the at least one pulse has a fractional bandwidth of at least about 20%, has a bandwidth of at least about 500 MHz, or has a fractional bandwidth of at least about 20% and has a bandwidth of at least about 500 MHz or more.

13. An electronic device for wireless communications, comprising:
a receiver configured to receive information identifying at least one resource of a second electronic device;
a processor configured to perform a comparison of resource information of the electronic device and the received resource information of the second electronic device; and
a transmitter configured to transmit a synchronization signal to the second device if at least one resource of the electronic device is less than at least one resource of the second electronic device based on the comparison.

14. The device of claim 13, wherein the transmitter is further configured to transmit the resource information of the electronic device to the second electronic device.

15. The device of claim 13, wherein the transmitter is configured to periodically transmit the resource information of the electronic device to the second electronic device.

16. The device of claim 13, wherein the synchronization signal comprises a beacon signal.

17. The device of claim 13, wherein the resource information of each of the electronic device and of the second electronic device comprises power resource information.

18. The device of claim 13, wherein the resource information of each of the electronic device and of the second electronic device comprises processing resource information.

19. The device of claim 13, wherein the synchronization signal comprises at least one timing parameter.

20. The device of claim 13, wherein the receiver is configured to receive a data transmitted from the second electronic device in response to the transmitted synchronization signal.

21. The device of claim 20, wherein the data comprises at least one timing parameter.

22. The device of claim 13, wherein the transmitter is configured to transmit the resource information of the electronic device in response to a pairing message from another device.

23. The device of claim 13, wherein the transmitted synchronization signal comprises at least one pulse.

24. The device of claim 23, wherein the at least one pulse has a fractional bandwidth of at least about 20%, has a bandwidth of at least about 500 MHz, or has a fractional bandwidth of at least about 20% and has a bandwidth of at least about 500 MHz or more.

25. An electronic device for wireless communications, comprising:
means for receiving, at the electronic device, information identifying at least one resource of a second electronic device;
means for comparing resource information of the electronic device and the received resource information of the second electronic device; and
means for transmitting a synchronization signal to the second electronic device if at least one resource of the electronic device is less than at least one resource of the second electronic device based on the comparison.

26. The device of claim 25, wherein the transmitting means is further configured to transmit the resource information of the electronic device to the second electronic device.

27. The device of claim 25, wherein the transmitting means is configured to periodically transmit the resource information of the electronic device to the second electronic device.

28. The device of claim 25, wherein the synchronization signal comprises a beacon signal.

29. The device of claim 25, wherein the resource information of each of the electronic device and of the second electronic device comprises power resource information.

30. The device of claim 25, wherein the resource information of each of the electronic device and of the second electronic device comprises processing resource information.

31. The device of claim 25, wherein the synchronization signal comprises at least one timing parameter.

32. The device of claim 25, wherein the receiving means is configured to receive data from the second electronic device in response to the transmitted synchronization signal.

33. The device of claim 32, wherein the data comprises at least one timing parameter.

34. The device of claim 25, wherein the transmitting means is configured to transmit the resource information of the electronic device in response to a pairing message from another device.

35. The device of claim 25, wherein the transmitted synchronization signal comprises at least one pulse.

36. The device of claim 35, wherein the at least one pulse has a fractional bandwidth of at least about 20%, has a bandwidth of at least about 500 MHz, or has a fractional bandwidth of at least about 20% and has a bandwidth of at least about 500 MHz or more.

37. A computer-program product for wireless communications, comprising:
computer-readable medium comprising codes executable by at least one computer to:
receive, at a first electronic device, information identifying at least one resource of a second electronic device;
compare resource information of the first electronic device and the received resource information of the second electronic device; and
transmit, at the first electronic device, a synchronization signal to the second electronic device if at least one resource of the first electronic device is less than at least one resource of the second electronic device based on the comparison.

38. A headset for wireless communications, comprising:
a microphone adapted to provide sensed data;
a receiver configured to receive information identifying at least one resource of an electronic device;
a processor configured to perform a comparison of resource information of the headset and the received resource information of the electronic device; and a transmitter configured to transmit a synchronization signal to the electronic device if at least one resource of the headset is less than at least one resource of the electronic device based on the comparison, wherein the transmitter is further configured to transmit the sensed data.

39. A medical device for wireless communications, comprising:
a sensor adapted to provide sensed data;
a receiver configured to receive information identifying at least one resource of an electronic device;
a processor configured to perform a comparison of resource information of the medical device and the received resource information of the electronic device; and
a transmitter configured to transmit a synchronization signal to the electronic device if at least one resource of the medical device is less than at least one resource of the electronic device based on the comparison, wherein the transmitter is further configured to transmit the sensed data.

40. A method of wireless communications, comprising:
receiving, at a first electronic device, information identifying at least one resource of a second electronic device;
comparing resource information of the first electronic device and the received resource information of the second electronic device; and
receiving, at the first electronic device, a synchronization signal from the second device if at least one resource of the first electronic device is greater than at least one resource of the second electronic device based on the comparison.

41. The method of claim 40, further comprising transmitting data to the second electronic device based on at least one communication parameter derived from the received synchronization signal.

42. The method of claim 41, wherein the data comprises at least one timing parameter.

43. The method of claim 40, wherein the synchronization signal comprises a beacon signal.

44. The method of claim 40, wherein the resource information of each of the first and second electronic devices comprises power resource information.

45. The method of claim 40, wherein the resource information of each of the first and second electronic devices comprises processing resource information.

46. The method of claim 40, wherein the synchronization signal comprises receiving at least one timing parameter.

47. The method of claim 40, further comprising periodically transmitting the resource information of the first electronic device to the second electronic device.

48. The method of claim 40 further comprising transmitting the resource information of the first electronic device in response to a pairing message from another device.

49. The method of claim 40, wherein the synchronization signal comprises at least one pulse.

50. The method of claim 49, wherein the at least one pulse has a fractional bandwidth of at least about 20%, has a bandwidth of at least about 500 MHz, or has a fractional bandwidth of at least about 20% and has a bandwidth of at least about 500 MHz or more.

51. An electronic device for wireless communications, comprising:
a receiver configured to receive information identifying at least one resource of a second electronic device; and
a processor configured to perform a comparison of resource information of the electronic device and the received resource information of the second electronic device, wherein the receiver is further configured to receive a synchronization signal from the second electronic device if at least one resource of the electronic device is less than at least one resource of the second electronic device based on the comparison.

52. The device of claim 51, further comprising a transmitter configured to transmit data to the second electronic device based on communication parameters derived from the received synchronization signal.

53. The device of claim 52, wherein the data comprises at least one timing parameter.

54. The device of claim 51, wherein the synchronization signal comprises a beacon signal.

55. The device of claim 51, wherein the resource information of each of the electronic device and second electronic device comprises power resource information.

56. The device of claim 51, wherein the resource information of each of the electronic device and second electronic device comprises processing resource information.

57. The device of claim 51, wherein the synchronization signal comprises at least one timing parameter.

58. The device of claim 51, wherein the receiver is configured to periodically receive the resource information of the second electronic device from the second electronic device.

59. The device of claim 51, wherein the receiver is configured to receive the resource information of the second electronic device in response to a pairing message transmitted by the electronic device.

60. The device of claim 51, wherein the received synchronization signal comprises at least one pulse.

61. The device of claim 60, wherein the at least one pulse has a fractional bandwidth of at least about 20%, has a bandwidth of at least about 500 MHz, or has a fractional bandwidth of at least about 20% and has a bandwidth of at least about 500 MHz or more.

62. An electronic device for wireless communications, comprising:
means for receiving information identifying at least one resource of a second electronic device;
means for comparing resource information of the electronic device and the received resource information of the second electronic device; and
means for receiving a synchronization signal from the second electronic device if at least one resource of the electronic device is greater than at least one resource of the second electronic device based on the comparing.

63. The device of claim 62, further comprising means for transmitting data to the second electronic device based on communication parameters derived from the received synchronization signal.

64. The device of claim 63, wherein the data comprises at least one timing parameter.

65. The device of claim 62, wherein the synchronization signal comprises a beacon signal.

66. The device of claim 62, wherein the resource information of each of the electronic device and second electronic device comprises power resource information.

67. The device of claim 62, wherein the resource information of each of the electronic device and second electronic device comprises processing resource information.

68. The device of claim 62, wherein the synchronization signal comprises at least one timing parameter.

69. The device of claim 62, wherein the receiving means is configured to periodically receive the resource information of the second electronic device from the electronic device.

70. The device of claim 62, wherein the receiving means is configured to receive the resource information of the second electronic device in response to a pairing message transmitted by the electronic device.

71. The device of claim 62, wherein the received synchronization signal comprises at least one pulse.

72. The device of claim 71, wherein the at least one pulse has a fractional bandwidth of at least about 20%, has a bandwidth of at least about 500 MHz, or has a fractional bandwidth of at least about 20% and has a bandwidth of at least about 500 MHz or more.

73. A computer-program product for wireless communications, comprising:
computer-readable medium comprising codes executable by at least one computer to:
receive, at a first electronic device, information identifying at least one resource of a second electronic device;
compare resource information of the first electronic device and the received resource information of the second electronic device; and
receive a synchronization signal from the second electronic device if at least one resource of the first electronic device is greater than at least one resource of the second electronic device based on the comparison.

74. A headset for wireless communications, comprising:
a microphone adapted to provide sensed data;
a receiver configured to receive information identifying at least one resource of an electronic device;
a processor configured to perform a comparison of resource information of the headset and the received resource information of the electronic device, wherein the receiver is further configured to receive a synchronization signal from the electronic device if at least one resource of the headset is greater than at least one resource of the electronic device based on the comparison; and
a transmitter configured to transmit sensed data based on the received synchronization.

75. A medical device for wireless communications, comprising:
a sensor adapted to provide sensed data;
a receiver configured to receive information identifying at least one resource of an electronic device;
a processor configured to perform a comparison of resource information of the medical device and the received resource information of the electronic device, wherein the receiver is further configured to receive a synchronization signal from the electronic device if at least one resource of the medical device is greater than at least one resource of the electronic device based on the comparison; and
a transmitter configured to transmit sensed data based on the received synchronization signal.

76. A method of wireless communications, comprising:
receiving, at a first electronic device, information identifying at least one resource of a second electronic device;
comparing resource information of a third electronic device and the received resource information of the second electronic device; and
instructing at least one component to transmit a synchronization signal to the third electronic device if the at least one resource of the second electronic device is less than at least one resource of the third electronic device based on the comparison.

77. The method of claim 76, wherein the first electronic device comprises the at least one component.

78. The method of claim 76, wherein the second electronic device comprises the at least one component.

79. The method of claim 78, wherein the instruction comprises transmitting a second signal to the at least one component of the second electronic device.

80. The method of claim 79, wherein the second signal comprises at least one timing parameter for communication between the second and third electronic devices.

81. An electronic device for wireless communications, comprising:
a receiver configured to receive information identifying at least one resource of a second electronic device;
a processor configured to:
perform a comparison of resource information of a third electronic device and the received resource information of the second electronic device; and
instruct at least one component to transmit a synchronization signal to the third electronic device if at least one resource of the second electronic device is less than at least one resource of the third electronic device based on the comparison.

82. The method of claim 76, wherein the synchronization signal comprises at least one pulse.

83. The method of claim 82, wherein the at least one pulse has a fractional bandwidth of at least about 20%, has a bandwidth of at least about 500 MHz, or has a fractional bandwidth of at least about 20% and has a bandwidth of at least about 500 MHz or more.

84. An electronic device for wireless communications, comprising:
a receiver configured to receive information identifying at least one resource of a second electronic device;
a processor configured to:
perform a comparison of resource information of a third electronic device and the received resource information of the second electronic device; and
instruct at least one component to transmit a synchronization signal to the third electronic device if at least one resource of the second electronic device is greater than at least one resource of the third electronic device based on the comparison.

85. The device of claim 84, wherein the electronic device comprises the at least one component.

86. The device of claim 84, wherein the second electronic device comprises the at least one component.

87. The device of claim 86, wherein the electronic device further comprises a transmitter, and wherein the instruction comprises transmitting a second signal to the at least one component of the second electronic device.

88. The device of claim 87, wherein the second signal comprises at least one timing parameter for communication between the second and third electronic devices.

89. The device of claim 87, wherein the second signal comprises the instruction to transmit the synchronization signal to the third electronic device.

90. The device of claim 84, wherein the synchronization signal comprises at least one pulse.

91. The device of claim 90, wherein the at least one pulse has a fractional bandwidth of at least about 20%, has a bandwidth of at least about 500 MHz, or has a fractional bandwidth of at least about 20% and has a bandwidth of at least about 500 MHz or more.

92. An electronic device for wireless communications, comprising:
means for receiving information identifying at least one resource of a second electronic device;

means for comparing resource information of a third electronic device and the received resource information of the second electronic device; and means for instructing at least one component to transmit a synchronization signal to the third electronic device if at least one resource of the second electronic device is less than at least one resource of the third electronic device based on the comparison.

93. The device of claim 92, wherein the electronic device comprises the at least one component.

94. The device of claim 92, wherein the second electronic device comprises the at least one component.

95. The device of claim 94, wherein the means for instructing transmits a second signal regarding the synchronization signal to the at least one component of the second device.

96. The device of claim 95, wherein the second signal comprises at least one timing parameter for communication between the second and third electronic devices.

97. The device of claim 95, wherein the second signal comprises the instruction to transmit the synchronization signal to the third electronic device.

98. The device of claim 92, wherein the synchronization signal comprises at least one pulse.

99. The device of claim 98, wherein the at least one pulse has a fractional bandwidth of at least about 20%, has a bandwidth of at least about 500 MHz, or has a fractional bandwidth of at least about 20% and has a bandwidth of at least about 500 MHz or more.

100. A headset for wireless communications, comprising:
a microphone adapted to provide sensed data;
a transmitter configured to transmit the sensed data;
a receiver configured to receive information identifying at least one resource of a first electronic device; and
a processor configured to:
perform a comparison of resource information of a second electronic device and the received resource information of the first electronic device; and
instruct at least one component to transmit a synchronization signal to the second electronic device if at least one resource of the first electronic device is less than at least one resource of the second electronic device based on the comparison.

101. A medical device for wireless communications, comprising:
a sensor adapted to provide sensed data;
a transmitter configured to transmit the sensed data;
a receiver configured to receive information identifying at least one resource of a first electronic device; and
a processor configured to:
perform a comparison of resource information of a second electronic device and the received resource information of the first electronic device; and
instruct at least one component to transmit a synchronization signal to the second electronic device if at least one resource of the first electronic device is less than at least one resource of the second electronic device based on the comparison.

102. A method of wireless communications, comprising:
transmitting information identifying at least one resource of a first electronic device from the first electronic device to a second electronic device; and
receiving, at the first electronic device, from the second electronic device data indicative of a determination of whether the at least one resource of the first electronic device is less than at least one resource of a third electronic device.

103. The method of claim 102, further comprising:
transmitting a synchronization signal from the first electronic device to the third electronic device based on the received determination.

104. The method of claim 102, wherein the received data comprises at least one timing parameter.

105. The method of claim 104, further comprising:
transmitting a signal from the first electronic device to the third electronic device based on the at least one timing parameter.

106. The method of claim 104, further comprising:
receiving a signal from the third electronic device at the first electronic device based on the at least one timing parameter.

107. The method of claim 102, wherein the second electronic device and the third electronic device are the same device.

108. The method of claim 102, wherein the data indicative of the determination comprises a synchronization signal.

109. The method of claim 102, wherein the received data comprises at least one pulse.

110. The method of claim 109, wherein the at least one pulse has a fractional bandwidth of at least about 20%, has a bandwidth of at least about 500 MHz, or has a fractional bandwidth of at least about 20% and has a bandwidth of at least about 500 MHz or more.

111. An electronic device for wireless communications, comprising:
a transmitter configured to transmit, to a second electronic device, information identifying at least one resource of the electronic device; and
a receiver configured to receive, from the second electronic device, data indicative of a determination of whether the at least one resource of the electronic device is less than at least one resource of a third electronic device.

112. The device of claim 111, wherein the transmitter is further configured to transmit a synchronization signal to the third electronic device based on the received determination.

113. The device of claim 111, wherein the received data comprises at least one timing parameter.

114. The device of claim 113, wherein the transmitter is further configured to transmit a signal from the first electronic device to the third electronic device based on the at least one timing parameter.

115. The device of claim 113, wherein the receiver is further configured to receive a signal from the third electronic device at the first electronic device based on the at least one timing parameter.

116. The device of claim 111, wherein the second electronic device and the third electronic device are the same device.

117. The device of claim 111, wherein the data indicative of the determination comprises a synchronization signal.

118. The device of claim 111, wherein the received data comprises at least one pulse.

119. The device of claim 118, wherein the at least one pulse has a fractional bandwidth of at least about 20%, has a bandwidth of at least about 500 MHz, or has a fractional bandwidth of at least about 20% and has a bandwidth of at least about 500 MHz or more.

120. An electronic device for wireless communications, comprising:
means for transmitting, to a second electronic device, information identifying at least one resource of the electronic device; and
means for receiving, from the second electronic device, data indicative of a determination of whether the at least one resource of the electronic device is less than at least one resource of a third electronic device.

121. The device of claim 120, wherein the transmitting means is further configured to transmit a synchronization signal to the third electronic based on the received determination.

122. The device of claim 121, wherein the transmitting means is further configured to transmit a signal from the first electronic device to the third electronic device based on the at least one timing parameter.

123. The device of claim 121, wherein the receiving means is further configured to receive a signal from the third electronic device at the first electronic device based on the at least one timing parameter.

124. The device of claim 120, wherein the received data comprises at least one timing parameter.

125. The device of claim 120, wherein the second electronic device and the third electronic device are the same device.

126. The device of claim 120, wherein the data indicative of the determination comprises a synchronization signal.

127. The device of claim 120, wherein the received data comprises at least one pulse.

128. The device of claim 127, wherein the at least one pulse has a fractional bandwidth of at least about 20%, has a bandwidth of at least about 500 MHz, or has a fractional bandwidth of at least about 20% and has a bandwidth of at least about 500 MHz or more.

129. A headset for wireless communications, comprising:
  a microphone adapted to provide sensed data;
  a transmitter configured to transmit the sensed data and further configured to transmit, to a first electronic device, information identifying at least one resource of the headset; and
  a receiver configured to receive, from the first electronic device, data indicative of a determination of whether the at least one resource of the headset is less than at least one resource of a second electronic device.

130. A medical device for wireless communications, comprising:
  a sensor adapted to provide sensed data;
  a transmitter configured to transmit the sensed data and further configured to transmit, to a first electronic device, information identifying at least one resource of the medical device; and
  a receiver configured to receive, from the first electronic device, data indicative of a determination of whether the at least one resource of the medical device is less than at least one resource of a second electronic device.

* * * * *